United States Patent [19]
Whetten et al.

[11] Patent Number: 5,929,128
[45] Date of Patent: Jul. 27, 1999

[54] GASKETS MADE FROM OLEFIN POLYMERS

[75] Inventors: Alan R. Whetten, Lake Jackson; Ronald P. Markovich, Houston; Steve M. Hoenig, Lake Jackson, all of Tex.; Edward E. Greene, Midland, Mich.

[73] Assignee: The Dow Chemical Company, Midland, Mich.

[21] Appl. No.: 08/700,327

[22] Filed: Aug. 8, 1996

Related U.S. Application Data

[63] Continuation-in-part of application No. 08/312,014, Sep. 23, 1994, abandoned, application No. 08/551,659, Nov. 1, 1995, Pat. No. 5,849,418, and application No. 08/615,549, Mar. 11, 1996, Pat. No. 5,723,507, said application No. 08/312,014, is a continuation of application No. 08/108,856, Aug. 18, 1993, abandoned, said application No. 08/551,659, is a continuation of application No. 08/392,287, Feb. 22, 1995, abandoned, which is a continuation of application No. 08/108,855, Aug. 18, 1993, abandoned.

[51] Int. Cl.$^6$ .................................................... C08J 9/08
[52] U.S. Cl. .............................. 521/85; 521/87; 521/88; 521/89; 521/90; 521/92; 521/95; 521/97; 521/98; 525/221; 525/227
[58] Field of Search .................................. 525/221, 227; 521/85, 87, 88, 89, 90, 92, 95, 97, 98

[56] References Cited

U.S. PATENT DOCUMENTS

| | | | |
|---|---|---|---|
| 2,717,025 | 9/1955 | Jelinek . | |
| 2,827,192 | 3/1958 | Warth . | |
| 3,134,496 | 5/1964 | Kehe . | |
| 3,164,485 | 1/1965 | Nagle | 117/43 |
| 3,183,144 | 5/1965 | Caviglia | 161/252 |
| 3,300,072 | 1/1967 | Caviglia | 215/40 |
| 3,414,938 | 12/1968 | Caviglia | 18/5 |
| 3,493,453 | 2/1970 | Ceresa et al. | 156/293 |
| 3,645,992 | 2/1972 | Elston | 260/80.78 |
| 3,779,965 | 12/1973 | Lefforge et al. | 260/28.5 |
| 3,786,954 | 1/1974 | Shull | 215/40 |
| 3,821,179 | 6/1974 | Powell | 260/88.1 R |
| 3,914,342 | 10/1975 | Mitchell | 260/897 |
| 4,076,698 | 2/1978 | Anderson et al. | 526/348.6 |
| 4,085,186 | 4/1978 | Rainer | 264/268 |
| 4,091,136 | 5/1978 | O'Brien et al. | 521/51 |
| 4,186,058 | 1/1980 | Rubens | 521/143 |
| 4,256,234 | 3/1981 | Mori et al. | 215/343 |
| 4,363,849 | 12/1982 | Paisley et al. | 521/143 |
| 4,500,664 | 2/1985 | McKinney et al. | 524/119 |
| 4,529,740 | 7/1985 | Trainor | 521/84 |
| 4,619,848 | 10/1986 | Knight et al. | 428/35 |
| 4,717,034 | 1/1988 | Mumford | 215/318 |
| 4,744,478 | 5/1988 | Hahn | 215/252 |
| 4,751,262 | 6/1988 | McKinney et al. | 524/231 |
| 4,798,081 | 1/1989 | Hazlitt et al. | 73/53 |
| 4,807,772 | 2/1989 | Schloss | 215/349 |
| 4,846,362 | 7/1989 | Schloss . | |
| 4,872,573 | 10/1989 | Johnson et al. | 215/347 |

(List continued on next page.)

FOREIGN PATENT DOCUMENTS

| | | |
|---|---|---|
| 0 339 831 | 11/1989 | European Pat. Off. . |
| 0 416 815 A2 | 3/1991 | European Pat. Off. ........ C08F 10/00 |
| 93/08221 | 4/1993 | WIPO . |
| 93/13143 | 7/1993 | WIPO . |
| WO 95/05426 | 2/1995 | WIPO . |
| WO 95/05427 | 2/1995 | WIPO . |
| WO 96/20878 | 7/1996 | WIPO . |

OTHER PUBLICATIONS

Exxon Chemical Feb. 1991 Tappi Journal Paper.

Randall (Rev. Macromol. Chem. Phys. C29(2&3) pp. 285–297 (1989).

Wild Journal of Polymer Science, Poly. Phys. Ed. vol. 20 pp. 441–445 (1982).

Williams & Ward, J. Polym. Science, Polymer Letters, vol. 6, pp. 621–624 (1968).

M. Shida R.N. Schroff—Polym. Eng. Sci. vol. 17, No. 11, pp. 769–774, 770, (1977).

John Daly, Rheometers for Molten Plastics, Van Nostrand Reinhold Co., pp. 97–99 (1982).

Ramamurthy, Journal of Rheology 30(2) pp. 337–357 (1986).

FDA Olefin Polymers 21 CFR § 177.1520 (Apr. 1, 1996).

Derwent Abstract 86–342455, Nippon Petrochem KK, Nov. 13, 1986, Derwent Publications Ltd. London, GB (JPA61255950).

Derwent Abstract 92–015357, Yoshino Kogyosho KK, Dec. 19, 1991, Derwent Publications Ltd. London, GB (JPA3289453).

International Search Report Dated Dec. 15, 1994 issued by the EPO acting as the international searching authority in PCT/US 94/09375 filed Aug. 18, 1994.

Derwent Abstract 86–342455 Nov. 1986.

Derwent Abstract 92–045357 Dec. 1992.

*Primary Examiner*—David W. Wu

[57] ABSTRACT

Gaskets comprising either at least one homogeneously branched ethylene polymer or at least one elastic substantially linear ethylene polymer, at least one ethylene/carboxylic acid interpolymer; and at least one slip agent are disclosed. These gaskets may also contain enhanced polyethylenes produced by the direct polymerization of various combinations of novel elastic substantially linear olefin polymers in multiple reactors using either single or multiple catalysts. These gaskets may also be comprised of at least one ethylene polymer and at least one ionomer. The above mentioned gaskets may also contain slip agents and/or foaming agents. The gaskets are particularly useful for sealing food and liquid containers and do not contribute to taste and/or odor of the packaged product, which is especially useful in food-stuff applications. Gaskets comprising substantially linear ethylene polymers have processability similar to highly branched low density polyethylene (LDPE), but the strength and toughness of linear low density polyethylene (LLDPE).

20 Claims, 6 Drawing Sheets

U.S. PATENT DOCUMENTS

| | | | |
|---|---|---|---|
| 4,897,437 | 1/1990 | McKinney et al. | 524/232 |
| 4,939,859 | 7/1990 | Bradt | 40/406 |
| 4,949,859 | 8/1990 | Bayer . | |
| 4,981,231 | 1/1991 | Knight | 215/341 |
| 4,984,703 | 1/1991 | Burzynski | 215/350 |
| 5,000,992 | 3/1991 | Kelch | 428/36.5 |
| 5,008,204 | 4/1991 | Stehling | 436/85 |
| 5,026,798 | 6/1991 | Canich | 526/127 |
| 5,055,438 | 10/1991 | Canich | 502/117 |
| 5,064,802 | 11/1991 | Stevens et al. | 502/155 |
| 5,104,710 | 4/1992 | Knight | 428/66 |
| 5,137,164 | 8/1992 | Bayer | 215/352 |
| 5,166,242 | 11/1992 | Chu et al. | 524/238 |
| 5,207,340 | 5/1993 | Cochrane | 215/25 B |
| 5,211,974 | 5/1993 | White | 426/106 |
| 5,215,587 | 6/1993 | McConnellogue et al. | 118/699 |
| 5,272,236 | 12/1993 | Lai et al. | 526/348.5 |
| 5,278,272 | 1/1994 | Lai et al. | 526/348.5 |
| 5,288,762 | 2/1994 | Park et al. | 521/79 |
| 5,340,840 | 8/1994 | Park et al. | 521/60 |
| 5,369,136 | 11/1994 | Park et al. | 521/143 |
| 5,387,620 | 2/1995 | Park et al. | 521/143 |
| 5,407,965 | 4/1995 | Park et al. | 521/81 |

GASKETS MADE FROM OLEFIN POLYMERS

CROSS REFERENCE TO RELATED APPLICATIONS

This application is a continuation in part of Ser. No 08/312,014 filed Sep. 23, 1994 (now abandoned) which itself is a continuation of application Ser. No. 08/108,856 filed Aug. 18, 1993 (now abandoned); a continuation in part of pending application Ser. No. 08/551,659 filed Nov. 1, 1995, now U.S. Pat. No. 5,849,418 which is a continuation of 08/392,287 filed Feb. 22, 1995 (now abandoned) which itself is a continuation of application Ser. No. 08/108,855 filed Aug. 18, 1993 (now abandoned); a continuation in part of pending application Ser. No. 08/615,549, filed Mar. 11, 1996; now U.S. Pat. No. 5,723,507 and is related to U.S. Pat. No. 5,272,236, to U.S. Pat. No. 5,278,272, to U.S. Pat. No. 5,340,840, and to U.S. Pat. No. 5,288,762 the disclosure of each of which is incorporated herein by reference.

FIELD OF THE INVENTION

This invention relates to polymer compositions with enhanced surface properties. In particular, this invention relates to gaskets made from olefin polymers. In one aspect, this invention relates to gaskets made from homogeneous linear olefin polymers. In another aspect, this invention relates to gaskets made from novel elastic substantially linear olefin polymers. In yet another aspect, this invention relates to gaskets formed from a composition containing novel elastic substantially linear olefin polymers. In still another aspect, this invention relates to gasket compositions containing enhanced polyethylenes produced by the direct polymerization of various combinations of novel elastic substantially linear olefin polymers in multiple reactors using either single or multiple catalysts. This invention also relates to gaskets comprising at least one ethylene polymer and at least ionomer. A further aspect of this invention relates to gaskets made from the above recited polymers and polymer compositions which contain at least one slip agent. Yet a further aspect of this invention relates to foamed gaskets made from the above recited polymers and polymer compositions. The gaskets are capable of compression sealing various containers, without contaminating the contents. Liquid containers particularly benefit from the use of the novel gasket materials disclosed herein.

BACKGROUND OF THE INVENTION

Gaskets have been made from a variety of structural materials, including polymers such as ethylene/vinyl acetate (EVA) and polyvinyl chloride (PVC). For example, U.S. Pat No. 4,984,703 (Burzynski) discloses plastic closures which have a sealing liner comprising a blend of ethylene/vinyl acetate and a thermoplastic elastomeric composition.

Depending on the use environment, gaskets can have varying degrees of properties. For example, in corrosive service conditions, the gasket must be impervious to the material in question, but still resilient enough to form a seal. Gaskets used in the food and beverage area have similar requirements, but cannot contaminate the foodstuff. For example, when a gasket is used as a bottle cap closure liner and the closure is applied and removed (and/or resealed), it is desireable for the gasket to retain its integrity and not shred or tear (known in the industry as "stringing" or "scuffing") such that pieces of it contaminate the foodstuff. Further, the gasket or closure liner should not deform such that it loses its seal integrity. Depending upon the type of food and/or liquid contents, the filling temperature might be lower or higher than room temperature, thus placing even greater demands on the gasket.

Various attempts to solve these challenges usually involve the use of oil additives or elastomer additives.

For example, U.S. Pat. No. 5,137,164 (Bayer), the disclosure of which is incorporated herein by reference, discloses a method of lining a plastic closure with a thermoplastic. The thermoplastic is a non-cross linked curable, vinyl chloride copolymer composition which has been plasticized with an epoxidized oil, an organic diglycidyl ether and a curing agent for the ether.

U.S. Pat. No. 4,807,772 (Schloss) and U.S. Pat. No. 4,846,362 (Schloss), the disclosure of each of which is incorporated herein by reference, disclose polypropylene and polyethylene closures, respectively, each having removable liners made from a blend of polyethylene and a thermoplastic, elastomeric copolymer (such as a block copolymer of styrene and butadiene). The blends are said to generally include 20–50 weight percent oil.

U.S. Pat. No. 4,872,573 (Johnson et al.), the disclosure of which is incorporated herein by reference, discloses barrier layers for closures selected from the group consisting of ethylene/vinyl alcohol copolymers and polyvinylidene chloride, especially for retarding oxygen containing gases migration.

U.S. Pat. No. 5,000,992 (Kelch), the disclosure of which is incorporated herein by reference, discloses a plastic container closure made from a coextruded multilayer foamed film. The film has at least one solid layer of a polyethylene blend and at least one foamed layer of a second polyethylene blend. The polyethylene blends can be blends of linear low density polyethylene (LLDPE) and low density polyethylene (LDPE). This type of a liner is co-extruded using a blown film or cast film process, unlike the process disclosed and claimed herein. The polymer blend (foamed & unfoamed layers) is used to laminate to other materials such as polyester or metallic films.

U.S. Pat. No. 3,786,954 (Shull), the disclosure of which is incorporated herein by reference, discloses laminated gaskets comprising a combination of a thick foamed polyethylene sheet material and a thin air and moisture impervious SARAN™ (trademark of and made by The Dow Chemical Company) layer adhered to the polyethylene by a low density polyethylene (LDPE) bond.

U.S. Pat. No. 5,104,710 (Knight), the disclosure of which is incorporated herein by reference, discloses improvement of gasket adhesion through use of propylene adhesion promoters. Knight also discloses a linear low density polyethylene (LLDPE) as a comparison example and shows that it has insufficient bond temperature of 200° C.

U.S. Pat. No. 4,529,740 (Trainor), the disclosure of which is incorporated herein by reference, discloses foamable structures made from elastomers such as styrene-butadiene block copolymers, a small amount of a salt of a sulfonated styrene polymer, and a blowing agent.

U.S. Pat. No. 4,744,478 (Hahn), the disclosure of which is incorporated herein by reference, discloses a molded closure comprising at least one substantially unfoamed polymer layer and an integrally molded foamed layer of the same polymer. The polymer can be olefins, styrenes, polyesters, polycarbonates, or other suitable engineering resins. A preferred polymer is a copolymer of propylene and EDPM rubber.

Polyvinyl chloride (PVC) polymers have also been used extensively as food closure gaskets, but these are increasingly coming under environmental pressures. Other polymers have also been used for their softness qualities, such as ethylene/methacrylic acid or ethylene/acrylic acid copolymers, but these often times contribute negatively to taste and odor problems, since the polymeric gasket comes in contact with the food and certain polymeric constituents leach into the food.

Higher density polyethylene (HDPE) also has been disclosed as useful for forming gaskets, since the higher density polyethylene has relatively good taste and odor properties, but has not been commercially successful to date, because the polymer is too "hard" and because by adding oil to reduce the hardness, the extractables increase, thus negating regulatory requirements for food contact. In addition, while heterogeneous linear low density polyethylene (LLDPE) has better softness properties than HDPE, this LLDPE does not adhere well to certain plastic closures (e.g., polypropylene, which is often used as a closure material, as described in U.S. Pat. No. 4,807,772) resulting in a loose polyethylene gasket. Further, this heterogeneous LLDPE, depending on the polymer's density, can also adversely affect taste and odor.

While there have been many different solutions to the problems of gasket materials, most of these incorporated additives causing other problems. We have now discovered olefin polymers and olefin polymer compositions useful in making gasket materials, without additives and, in the case of foodstuff, without adversely contributing to the taste and/or odor of the product.

SUMMARY OF THE INVENTION

Gaskets comprising at least one homogeneously branched linear or homogeneously branched substantially linear olefin interpolymer have now been discovered to have these often conflicting attributes. The homogeneously branched olefin interpolymers have an unusual combination of properties, making them especially useful for gasket materials. Preferably, the homogeneously branched olefin interpolymer is an ethylene interpolymer and more preferably, an ethylene/alpha-olefin interpolymer.

The homogeneously branched substantially linear ethylene polymers have the processability similar to highly branched low density polyethylene (LDPE), but the strength and toughness of linear low density polyethylene (LLDPE). However, the homogeneously branched substantially linear olefin polymers are distinctly different from traditional Ziegler polymerized heterogeneous polymers (e.g., LLDPE) and are also different from traditional free radical/high pressure polymerized highly branched LDPE. Surprisingly, the novel substantially linear olefin polymers are also different from linear homogeneous olefin polymers having a uniform branching distribution.

The substantially linear ethylene polymers are characterized as having various properties, alone or in combination:

a) a melt flow ratio, $I_{10}/I_2$, $\geq 5.63$, b) a molecular weight distribution, $M_w/M_n$, defined by the equation:

$$M_w/M_n \leq (I_{10}/I_2) - 4.63,$$

and c) a critical shear stress at onset of gross melt fracture greater than $4 \times 10^6$ dyne/cm$^2$, d) a critical shear rate at onset of surface melt fracture at least 50 percent greater than the critical shear rate at the onset of surface melt fracture of a linear ethylene polymer having about the same $I_2$, density, and $M_w/M_n$, and/or e) a processing index (PI) less than or equal to about 70 percent of the PI of a comparative linear ethylene polymer at about the same $I_2$, density, and $M_w/M_n$.

In still another aspect, this invention relates to gasket compositions containing enhanced polyethylenes produced by the direct polymerization of various combinations of novel elastic substantially linear olefin interpolymers in multiple reactors using either single or multiple catalysts.

Another aspect of this invention teaches a gasket comprising at least one ethylene interpolymer and at least one ethylene/α,βethylenically unsaturated carboxylic acid interpolymer (e.g., ethylene/acrylic acid interpolymers) or ionomer thereof.

Another aspect of this invention teaches a gasket made from the above recited polymers and polymer compositions and containing at least one slip agent (such as Erucamide* made by Witco Corporation).

Another aspect of the invention relates to foamed gaskets made from the above recited polymers and polymer compositions.

A complete olefinic system (such as a gasket comprising the ethylene polymer or polymer compositions and a cap comprising a polyethylene or polypropylene polymer) can also be recycled together. Potential uses of the recycled polymers include melt spinning biconstituent fiber, as described in U.S. Pat. No. 5,133,917 (Jezic et al.), the disclosure of which is incorporated herein by reference.

DETAILED DESCRIPTION OF THE INVENTION

Figure 1:
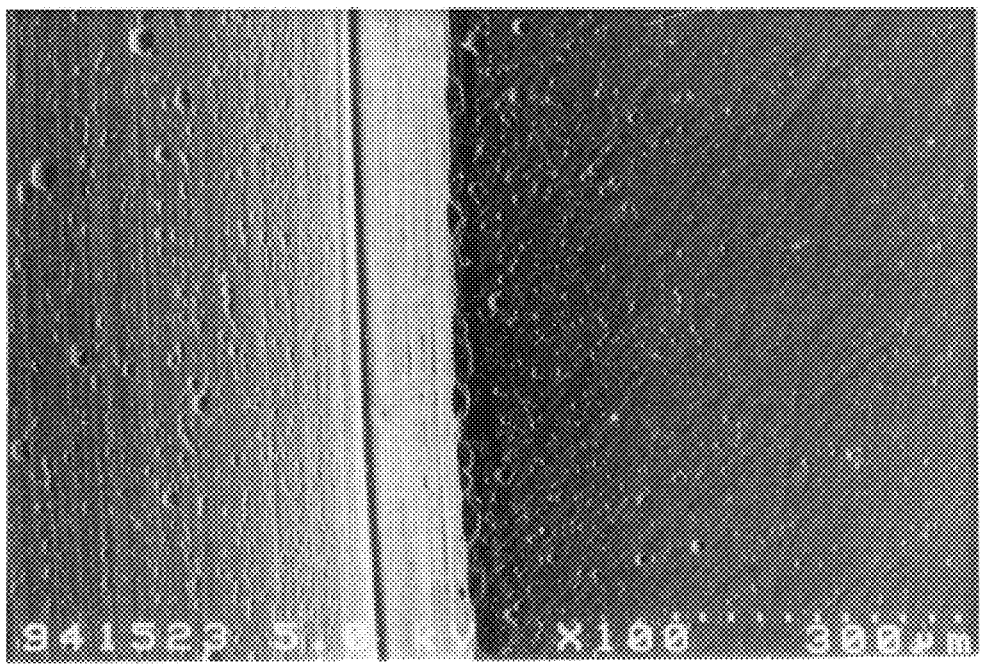
FIG. 1 is a scanning electron micrograph of a molded plaque surface for a blend consisting of 97.5% AFFINITY™ SM 1300, 1.5% Kemamide* E (an erucamide made by Witco Corp.), and 1.0% Spectratech* CM 31254 (made by Quantum Chemical).

The term "linear ethylene polymers" used herein means that the ethylene polymer does not have long chain branching. That is, the linear ethylene polymer has an absence of long chain branching, as for example the traditional heterogeneous linear low density polyethylene polymers or linear high density polyethylene polymers made using Ziegler polymerization processes (e.g., U.S. Pat. No. 4,076,698 (Anderson et al.), the disclosure of which is incorporated herein by reference), sometimes called heterogeneous polymers. The Ziegler polymerization process, by its catalytic nature, makes polymers which are heterogeneous, i.e., the polymer has several different types of branching within the same polymer composition as a result of numerous metal atom catalytic sites. In addition, the heterogeneous polymers produced in the Ziegler process also have broad molecular weight distributions (MWD); as the MWD increases, the $I_{10}/I_2$ ratio concurrently increases.

The term "linear ethylene polymers" does not refer to high pressure branched polyethylene, ethylene/vinyl acetate copolymers, or ethylene/vinyl alcohol copolymers which are known to those skilled in the art to have numerous long chain branches. The term "linear ethylene polymers" can refer to polymers made using uniform branching distribution polymerization processes, sometimes called homogeneous polymers. Such uniformly branched or homogeneous polymers include those made as described in U.S. Pat. No. 3,645,992 (Elston), the disclosure of which is incorporated herein by reference, and those made using so-called single site catalysts in a batch reactor having relatively high olefin concentrations (as described in U.S. Pat. No 5,026,798 (Canich) or in U.S. Pat. No. 5,055,438 (Canich), the disclosures of which are incorporated herein by reference) or those made using constrained geometry catalysts in a batch reactor also having relatively high olefin concentrations (as described in U.S. Pat. No. 5,064,802 (Stevens et al.), the disclosure of which is incorporated herein by reference, or in EPA 0 416 815 A2 (Stevens et al.)). The uniformly branched/homogeneous polymers are those polymers in which the comonomer is randomly distributed within a given interpolymer molecule and wherein substantially all of the interpolymer molecules have the same ethylene/ comonomer ratio within that interpolymer, but these polymers too have an absence of long chain branching, as, for example, Exxon Chemical has taught in their February 1992 Tappi Journal paper.

The term "substantially linear" means that the polymer has long chain branching and that the polymer backbone is substituted with 0.01 long chain branches/1000 carbons to 3 long chain branches/1000 carbons, more preferably from 0.01 long chain branches/1000 carbons to 1 long chain branches/1000 carbons, and especially from 0.05 long chain branches/1000 carbons to 1 long chain branches/1000 carbons. Similar to the traditional linear homogeneous polymers, the substantially linear ethylene/α-olefin copolymers used in this invention also have a homogeneous branching distribution and only a single melting point, as opposed to traditional Ziegler polymerized heterogeneous linear ethylene/α-olefin copolymers which have two or more melting points (determined using differential scanning calorimetry (DSC)). The substantially linear ethylene polymers are described in U.S. Pat. No. 5,272,236 and U.S. Pat. No. 5,278,272, the disclosures of which are incorporated herein by reference.

Long chain branching for the substantially linear ethylene polymers is defined herein as a chain length of at least 6 carbons, above which the length cannot be distinguished using $^{13}C$ nuclear magnetic resonance spectroscopy. The long chain branch of the substantially linear ethylene polymers is, of course, at least one carbon longer than two carbons less than the total length of the comonomer copolymeried with ethylene. For example, in an ethylene/1-octene substantially linear polymer, the long chain branch will be at least seven carbons in length. However, the long chain branch can be as long as about the same length as the length of the polymer back-bone. For substantially linear ethylene/alpha-olefin copolymers, the long chain branch is also itself homogeneously branched, as is the backbone to which the branch is attached.

For ethylene homopolymers and certain ethylene/alpha-olefin copolymers, long chain branching is determined by using $^{13}C$ nuclear magnetic resonance spectroscopy and is quantified using the method of Randall (*Rev. Macromol. Chem. Phys.*, C29 (2&3), pp. 285–297) the disclosure of which is incorporated herein by reference.

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly Phys. Ed.*, Vol. 20, p. 441 (1982), or as described in U.S. Pat. No. 4,798,081 or as is described in U.S. Pat. No. 5,008,204 (the Stehling patent on low temperature TREF), the disclosure of which is incorporated herein by reference. The SCBDI or CDBI for the homogeneously branched linear or homogeneously branched substantially linear olefin polymers of the present invention is greater than about 30 percent, preferably greater than about 50 percent, and especially greater than about 80 percent.

A unique characteristic of the substantially linear olefin polymers of the present invention is a highly unexpected flow property where the $I_{10}/I_2$ value is essentially independent of polydispersity index (i.e. $M_w/M_n$). This is contrasted with conventional Ziegler polymerized heterogeneous polyethylene resins and with conventional single site catalyst polymerized homogeneous polyethylene resins having rheological properties such that as the polydispersity index increases (or the MWD), the $I_{10}/I_2$ value also increases.

The density of the substantially linear homogeneously branched ethylene or linear homogeneously branched ethylene/α-olefin polymers used in the present invention is measured in accordance with ASTM D-792 and is generally from about 0.85 g/cm³ to about 0.96 g/cm³, preferably from about 0.87 g/cm³ to about 0.92 g/cm³, and especially from about 0.89 g/cm³ to about 0.915 g/cm³.

The density is obviously related to the amount of comonomer incorporated into the polymer; the higher the comonomer incorporated, the lower the density. The Food and Drug Administration (FDA) currently limits hexane extractables for polyethylene for food contact to not more than 5.5%. The method is described in FDA regulation 21 CFR Ch. 1 (Apr. 1, 1994 Edition) §177.1520, pages 252–253. Even though molecular weight distribution influences hexane extractables, larger amounts of comonomer, especially for heterogeneous polyethylene copolymers, causes higher levels of hexane extractables. For example, heterogeneous ethylene/1-octene linear polyethylene having densities from about 0.9017 to about 0.91 g/cm³ generally have hexane extractables greater than 5%. In contrast, homogeneous substantially linear and homogeneous linear ethylene/1-octene copolymers having densities at least as low as about 0.8976 g/cm³ have hexane extractables less than 5%, preferably less than about 2% and especially less than about 1%.

Melting point (and Vicat softening point) of the homogeneously branched linear or homogeneously branched substantially linear olefin polymers of the present invention correlates primarily with the density of the polymer since the substantially linear ethylene polymers lack a high density (i.e., linear) fraction, with some effects attributable to the molecular weight of the polymer (indicated melt index). Melting point variation of the homogeneously branched linear or homogeneously branched substantially linear olefin polymers of the present invention is contrasted with heterogeneous ethylene polymers having two or more melting points (due to their broad branching distribution), one of which is about 126° C. and is attributable the high density linear polyethylene fraction. The lower the density of the homogeneously branched linear or homogeneously branched substantially linear olefin polymers of the present invention, the lower the melting point. For example, Table 1 lists Vicat softening point (as measured using ASTM D-1525) versus density for various substantially linear ethylene/1-octene copolymers:

TABLE 1

| Density (gm/cm³) | Vicat Softening Point (° C.) |
|---|---|
| 0.939 | 125 |
| 0.922 | 100 |

TABLE 1-continued

| Density (gm/cm³) | Vicat Softening Point (° C.) |
|---|---|
| 0.903 | 84 |
| 0.886 | 63 |
| 0.884 | 58 |
| 0.872 | 44 |

Some gaskets must withstand temperatures higher than room temperature (about 25° C.) for brief times, particularly where the application is a "hot fill" application. For example, products which must undergo pasteurization must have gaskets that have melting points greater than 100° C. Thus the substantially linear ethylene polymer can be selected specifically for the application in question by selecting the appropriate density for use in the gasket environment.

The molecular weight of the homogeneously branched linear or homogeneously branched substantially linear olefin polymers used in the present invention is conveniently indicated using a melt index measurement according to ASTM D-1238, Condition 190 C/2.16 kg (formally known as "Condition (E)" and also known as $I_2$). Melt index is inversely proportional to the molecular weight of the polymer. Thus, the higher the molecular weight, the lower the melt index, although the relationship is not linear. The melt index for the homogeneously branched linear or homogeneously branched substantially linear olefin polymers used herein is generally from about 0.01 grams/10 minutes (g/10 min) to about 1000 g/10 min, preferably from about 0.15 g/10 min to about 100 g/10 min, and especially from about 1 g/10 min to about 30 g/10 min. Molecular weight, as indicated by the melt index, will be dependent upon the shear rate necessary to process the polymer into the gasket.

Another measurement useful in characterizing the molecular weight of the homogeneously branched linear or homogeneously branched substantially linear olefin polymers is conveniently indicated using a melt index measurement according to ASTM D-1238, Condition 190° C./10 kg (formerly known as "Condition (N)" and also known as $I_{10}$). The ratio of these two melt index terms is the melt flow ratio and is designated as $I_{10}/I_2$. For the substantially linear ethylene/α-olefin polymers of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above. The upper limit of the $I_{10}/I_2$ ratio can be about 50, preferably about 20, and especially about 15. For the novel substantially linear ethylene polymers, the melt flow ratio ($I_{10}/I_2$) can be increased to compensate for the use of higher molecular weight polymers (i.e., lower melt index polymers). Thus, an elastic substantially linear ethylene polymer having a melt index of about 10 grams/10 minutes, a density of about 0.92 g/cm³, $M_w/M_n$ of about 2, and $I_{10}/I_2$ of about 10 will have a viscosity similar to a substantially linear ethylene polymer having a melt index of about 30 grams/10 minutes, a density of about 0.92 g/cm³, $M_w/M_n$ of about 2, and $I_{10}/I_2$ of about 7.5, when using approximately the same shear rate.

The homogeneous linear ethylene polymers or substantially linear ethylene interpolymers are present in the three component composition used in the gasket in an amount in the range of about 80% to about 97.5% by total weight of the three component composition. Preferably, the homogeneous linear ethylene interpolymer or substantially linear interpolymer can be found in the three component gasket compositions in the range of about 85% to about 97.5%. More preferably, the homogeneous linear ethylene interpolymer or substantially linear ethylene interpolymer can be found in the gasket composition in the range of about 90% to about 97.5%. The three component composition can be admixed with other materials, such as styrene/butadiene/styrene block polymers ("SBS"). Preferably, the three component composition comprises from about 50 percent, especially from about 80 percent, to 100 percent of the gasket, by weight of the gasket.

The gaskets made from the novel substantially linear ethylene polymers must be hard enough to withstand compression, but still soft enough such that an adequate seal is formed. Thus, the hardness of the polymer enables varying gaskets to be made, depending on the use. Hardness is measured herein as "Shore A" hardness (as determined using ASTM D-2240). For the substantially linear ethylene polymers which comprise the gaskets, the Shore A hardness ranges from about 70 to about 100, even without the use of petroleum oils commonly included to reduce the hardness of the polymer and resulting gasket. Table 2 summarizes Shore A data versus polymer density for substantially linear ethylene/1-octene copolymers used to make gaskets:

TABLE 2

| Polymer Density (g/cm$^3$) | Shore A Hardness |
| --- | --- |
| 0.87 | 73 |
| 0.871 | 75 |
| 0.884 | 85 |
| 0.886 | 87 |
| 0.902 | 93 |
| 0.908 | 95 |
| 0.912 | 95 |
| 0.922 | 96 |
| 0.94 | 97 |

Additives such as antioxidants (e.g., hindered phenolics (e.g., Irganox® 1010 made by Ciba Geigy Corp.), phosphites (e.g., Irgafos® 168 made by Ciba Geigy Corp.)), cling additives (e.g., polyisobutylene (PIB)), slip additives (e.g., erucamide), antiblock additives, pigments, and the like can also be included in the gasket compositions, to the extent that they do not interfere with the enhanced properties discovered by Applicants.

Molecular Weight Distribution Determination

The whole interpolymer product samples and the individual interpolymer samples are analyzed by gel permeation chromatography (GPC) on a Waters 150 C. high temperature chromatographic unit equipped with three mixed porosity columns (Polymer Laboratories 10$^3$, 10$^4$, 10$^5$, and 10$^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene} = a^* (M_{polystyrene})^b.$$

In this equation, a=0.4316 and b=1.0. Weight average molecular weight, $M_w$, is calculated in the usual manner according to the following formula:

$M_w = \Sigma w_i * M_i$, where $w_i$ and $M_i$ are the weight fraction and molecular weight, respectively, of the $i^{th}$ fraction eluting from the GPC column.

The molecular weight distribution ($M_w/M_n$) for the substantially linear ethylene interpolymers or the homogeneous linear ethylene interpolymers used in the invention is generally less than about 5, preferably from about 1.5 to about 2.8, and especially from about 1.8 to about 2.8.

Processing Index Determination

The rheological processing index (PI) is measured by a gas extrusion rheometer (GER). The GER is described by M. Shida, R. N. Shroff and L. V. Cancio in Polym. Eng. Sci., Vol. 17, no. 11, p. 770 (1977), and in "Rheometers for Molten Plastics" by John Dealy, published by Van Nostrand Reinhold Co. (1982) on page 97–99. The processing index is measured at a temperature of 190° C., at nitrogen pressure of 2500 psig using a 0.0296 inch (752 micrometers) diameter, 20:1 L/D die having an entrance angle of 180°. The GER processing index is calculated in millipoise units from the following equation:

$PI = 2.15 \times 10^6$ dynes/cm$^2$/(1000×shear rate), where:
2.15×10$^6$ dynes/cm$^2$ is the shear stress at 2500 psi, and the shear rate is the shear rate at the wall as represented by the following equation:

32 Q'/(60 sec/min)(0.745)(Diameter×2.54 cm/in)$^3$, where:
Q' is the extrusion rate (gms/min),
0.745 is the melt density of polyethylene (gm/cm$^3$), and
Diameter is the orifice diameter of the capillary (inches). The PI is the apparent viscosity of a material measured at apparent shear stress of 2.15×10$^6$ dyne/cm$^2$.

For the substantially linear olefin polymers used herein, the PI is less than or equal to 70 percent of that of a comparative linear olefin polymer at about the same $I_2$, $M_w/M_n$ and density. By "about the same" is meant that each value is within 10 percent of the other compared value.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40× magnification. The critical shear rate at onset of surface melt fracture for the substantially linear ethylene polymers is at least 50 percent greater than the critical shear rate at the onset of surface melt fracture of a linear ethylene polymer having about the same $I_2$, $M_w/M_n$, and density. Preferably, the critical shear stress at onset of surface melt fracture for the substantially linear olefin polymers used in the invention is greater than 2.8×10$^6$ dynes/cm$^2$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and critical shear stress at onset of gross melt fracture (OGMF) will be used herein based on the changes of surface roughness and configurations of the extrudates extruded by a GER. For the substantially linear olefin polymers used in the invention, the critical shear stress at onset of gross melt fracture is preferably greater than $4 \times 10^6$ dynes/cm$^2$.

The substantially linear olefin polymers useful in the present invention can be homopolymers of $C_2$–$C_{20}$ α-olefins, such as ethylene, propylene, 4-methyl-1-pentene, etc., or they can be interpolymers of ethylene with at least one $C_3$–$C_{20}$ α-olefin and/or $C_2$–$C_{20}$ acetylenically unsaturated monomer and/or $C_4$–$C_{18}$ diolefins. The substantially linear polymers used in the present invention can also be interpolymers of ethylene with at least one of the above $C_3$–$C_{20}$ α-olefins, diolefins and/or acetylenically unsaturated monomers in combination with other unsaturated monomers. The term "interpolymer" means that the polymer has at least two comonomers (e.g., a copolymer) and also includes more than two comonomers (e.g., terpolymers). Substantially linear ethylene/alpha-olefin copolymers are preferred however, and ethylene/ $C_3$–$C_{20}$ α-olefin copolymers are especially preferred.

The Constrained Geometry Catalyst

Suitable constrained geometry catalysts for preparing the substantially linear ethylene polymers preferably include constrained geometry catalysts as disclosed in U.S. application Ser. No. 545,403, filed Jul. 3, 1990; Ser. No. 758,654, filed Sep. 12, 1991; Ser. No. 758,660, filed Sep. 12, 1991; and Ser. No. 720,041, filed Jun. 24, 1991. The monocyclopentadienyl transition metal olefin polymerization catalysts taught in U.S. Pat. No. 5,026,798, are also believed to be suitable for use in preparing the substantially linear ethylene polymers of the present invention, so long as the polymerization conditions substantially conform to those described in U.S. Pat. No. 5,272,236 and U.S. Pat. No. 5,278,272.

Polymerization

The improved melt elasticity and processibility of the substantially linear polymers used in the present invention result, it is believed, from their method of production. The polymers may be produced via a continuous (as opposed to a batch or semi-batch operation) controlled polymerization process using at least one reactor, but can also be produced using multiple reactors (e.g., using a multiple reactor configuration as described in U.S. Pat. No. 3,914,342) at a polymerization temperature and pressure sufficient to produce the interpolymers having the desired properties. In-reactor blends of a homgeneously branched ethylenepolymer with a heterogeneously branched ethylene polymer can also be prepared according to the methods described in pending application Ser. No. 08/510,527 filed Aug. 2, 1995, now abandoned the disclosure of which is incorprated herein by reference.

In polymerizing ethylene and ethylene/α-olefin copolymers, a batch reactor process typically operates at an ethylene concentration from about 6.7 to about 12.5 percent by weight of the reactor contents and have a polymer concentration generally less than about 5 percent by weight of the reactor contents, dependent upon the ethylene solubility, which is a function of reactor temperature and pressure.

The gasket compositions may also contain polyethylene blends produced by the direct polymerization of various combinations of elastic substantially linear or linear olefin polymers in multiple reactors using either single or multiple catalysts.

When a blend of polyethylenes is used as a first component, the blends are present in the gasket in an amount in the range of about 50%, preferably about 80%, to about 97.5% by weight of the three component composition. Preferably, the polyethylene blends can be found in the three component composition in the range of about 85% to about 97.5%. More preferably, the polyethylene blends can be found in the gasket composition in the range of about 90% to about 97.5%.

Other polymers can also be combined with effective amounts of the substantially linear ethylene polymers to make the gaskets as well, depending upon the end use properties required. These other polymers are thermoplastic polymers (i.e., melt processable) and include polymers such as highly branched low density polyethylene, heterogeneously branched linear low density polyethylene, ethylene/ vinyl acetate copolymers, and ionomers such as ethylene/ acrylic acid copolymers (e.g., PRIMACOR™ Adhesive Polymers made by The Dow Chemical Company).

Ionomers are ionically crosslinked thermoplastics generally obtained by neutralizing a copolymer containing pendant acid groups e.g., carboxylic acid groups, with an ionizable metal compound, e.g., a compound of the monovalent, divalent and/or trivalent metals of Group I, II, IV-A and VIIIB of the periodic table of the elements.

Preferred groups of ionomer resins are derived from a copolymer of at least one alpha-olefin and at least one ethylenically unsaturated carboxylic acid and/or anhydride. Suitable alpha-olefins include ethylene, propylene, 1-butene, 1-pentene, 1-hexene, 1-heptene, 3-methylbutene, and the like. Suitable carboxylic acids and anhydrides include acrylic acid, methacrylic acid, ethacrylic acid, maleic acid, fumaric acid, maleic anhydride, and the like. The foregoing copolymers generally contain from about 0.2 to about 20 mole percent, and preferably from about 0.5 to about 10 mole percent, carboxylic acid groups.

Particular examples of such copolymers include ethylene-acrylic acid copolymers, ethylene-methacrylic acid copolymers, ethylene-itaconic acid copolymers, ethylene-methyl hydrogen maleate copolymers, ethylene-maleic acid copolymers, ethylene-acrylic acid copolymers, ethylene-methacrylate copolymers, ethylene-methacrylic acid-ethacrylate copolymers, ethylene-itaconic acid- methacrylate copolymers, ethylene-itaconic acid-methacrylate copolymers, ethylene-methyl hydrogen maleate-ethyl acrylate copolymers, ethylene-methacrylic acid-vinyl acetate copolymers, ethylene-acrylic acid copolymers, ethylene-acrylic acid-vinyl alcohol copolymers, ethylene-acrylic acid-carbon monoxide copolymers, ethylene-propylene-acrylic acid copolymers, ethylene-methacrylic acid-acrylonitrile copolymers, ethylene-fumaric acid-vinyl methyl ether copolymers, ethylene-vinyl chloride-acrylic acid copolymers, ethylene-vinylidene chloride-acrylic acid copolymers, ethylene-vinylidene chloride-acrylic acid copolymers,ethylene-vinyl fluoride-methacrylic acid copolymers and ethylene-chlorotrifluoroethlyene-methacrylic acid copolymers.

Preferred ionomers are obtained by reacting the foregoing copolymers with a sufficient amount of metal ions as to neutralize at least some portion of the acid groups, preferably at least about 5 percent by weight and preferably from about 20 to about 100 percent by weight, of the acid groups present. Suitable metal ions include $Na^+$, $K^+$, $Li+$, $Cs^+$, $Rb^+$, $Hg^+$, $Cu^+$, $Be^{+2}$, $Mg^{+2}$, $Ca^{+2}$, $Sr^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$, $Zn^{+2}$, $Al^{+3}$ and $Y^{+3}$. Preferred metals suitable for neutralizing the copolymers used herein are the alkali metals, particularly, cations such as sodium, lithium and potassium and alkaline earth metals, in particular, cations such as calcium, magnesium and zinc. One or more ionomers may be used in the present invention. Preferred ionomers include Surlyn® 1702, which is a zinc salt of an ethylene and methacrylic acid copolymer and Surlyn® 8660, which is a sodium salt of an ethylene and methacrylic acid copolymer. Both Surlyn® 1702 and Surlyn® 8660 may be obtained from E. I. Dupont de Nemours & Company, Wilmington, Del.

The ethylene/carboxylic acid interpolymer or ionomer may be found in the gasket composition in the range of about 2% to about 15% by weight of the three component composition. Preferably, the ethylene/carboxylic acid interpolymer or ionomer may be found in the gasket composition in the range of about 4% to about 12%. Most preferably, the ethylene/carboxylic acid interpolymer or ionomer may be found in the gasket composition in an amount in the range of about 4% to about 10%.

In another embodiment of the invention, a gasket composition may comprise substantially linear polyethylene and a interpolymer of ethylene and acrylic acid. The acrylic acid can be found in the interpolymer in the range of about 3% to about 50% by weight of the interpolymer. Preferably, the acrylic acid can be found in the range of about 5% to 18%, and most preferably, from about 6.5% to about 15%.

The interpolymer of ethylene and acrylic acid may be found in the three component gasket compositions in the range of about 2% to about 15% by weight of the three components. Preferably, the interpolymer may be found at about 2% to about 12% by weight, and most preferably, from about 2% to about 10%. The melt index of the interpolymer of ethylene and acrylic acid is about 0.15 to about 400 g/10 min. Preferably, the melt index is about 1 to about 100 g/10 min., and most preferably, from about 1 to about 30 g/10 min.

An example of a suitable interpolymer of ethylene and acrylic acid is Primacor™ 5980 (having about 20% acrylic acid and a melt index ($I_2$) of about 300 grams/10 minutes), which may be purchased from The Dow Chemical Company. Examples of other suitable interpolymers of ethylene and acrylic acid may be found in U.S. Pat. Nos. 4,500,664, 4,988,781 and 4,599,392, the disclosures of which are hereby incorporated by reference.

The sealing gasket compositions of the present invention may also include various other components that are known to those skilled in the art. Examples of other materials which may be included in the gasket composition are a lubricants and colorants. Examples of suitable lubricants include, but are not limited to, stearates and fatty amides, such as Kemmamide-E® (also called erucamide), which can be obtained from the Witco Corporation. Examples of suitable, colorants include, but are not limited to, thaloblue, which may be obtained from Quantum Chemical Corporation.

Suitable Blowing Agents

Foaming agents suitable for use in the gaskets disclosed herein include physical blowing agents which function as gas sources by going through a change of physical state. Volatile liquids produce gas by passing from the liquid to gaseous state, whereas compressed gases are dissolved under pressure in the melted polymer. Chemical blowing agents produce gas by a chemical reaction, either by a thermal decomposition or by a reaction between two components.

Suitable physical blowing agents include pentanes (e.g., n-pentane, 2-methylbutane, 2,2-dimethylpropane, 1-pentane and cyclopentane), hexanes (e.g., n-hexane, 2-methylpentane, 3-methylpentane, 2,3-dimethylbutane, 2,2-dimethylbutane, 1-hexene, cyclohexane), heptanes (e.g., n-heptane, 2-methylhexane, 2,2-dimethylpentane, 2,3-dimethylpentane, 2,4-dimethylpentane, 3,3-dimethylpentane, 3-ethylpentane, 2,2,3-trimethylbutane, 1-heptene), benzene, toluene, dichloromethane, trichloromethane, trichloroethylene, tetrachloromethane, 1,2-dichloroethane, trichlorofluoromethane, 1,1,2-trichlorotrifluoroethane, methanol, ethanol, 2-propanol, ethyl ether, isopropyl ether, acetone, methyl ethyl ketone, and methylene chloride.

Suitable gaseous blowing agents include carbon dioxide and nitrogen.

Suitable chemical blowing agents include sodium bicarbonate, dinitrosopentamethylenetetramine, sulfonyl hydrazides, azodicarbonamide (e.g., Celogen™ AZNP 130 made by Uniroyal Chemical), p-toluenesulfonyl semicarbazide, 5-phenyltetrazole, diisopropylhydrazodicarboxylate, 5-phenyl-3,6-dihydro-1,3,4-oxadiazin-2-one, and sodium borohydride.

The amount of blowing agent is dependent on the desired density reduction. One can calculate the amount of blowing agent required by knowing the volume of gas produced per gram of blowing agent at a given temperature and the desired density reduction (or target density) for a desired application. For chemical blowing agents the range is 0.1 to 4% by weight and more preferably 0.25 to 2% by weight. This range can also be adjusted by the addition of activation agents (sometimes referred to as coagents) such as (zinc oxide, zinc stearate).

Foams useful for making the gaskets claimed herein can be made as described in U.S. Pat. No. 5,288,762, U.S. Pat. No. 5,340,840, U.S. Pat. No. 5,369,136, U.S. Pat. No. 5,387,620 and U.S. Pat. No. 5,407,965, the disclosures of each of which are incorporated herein by reference in their entirety.

Suitable Gasket Configurations

Gaskets can have many different forms, including "o-rings" and flat seals (e.g., "film-like" gaskets having a thickness commensurate with the intended use).

Suitable end uses include gaskets for metal and plastic closures, as well as other gasket applications. These applications include beverage cap liners, hot fill juice cap liners, polypropylene cap liners, steel or aluminum cap liners, high density polyethylene cap liners, window glass gaskets, sealed containers, closure caps, gaskets for medical devices, filter elements, pressure venting gaskets, hot melt gaskets, easy twist off caps, electrochemical cell gaskets, refrigerator gaskets, galvanic cell gaskets, leak proof cell gaskets, waterproofing sheet, reusable gaskets, synthetic cork like materials, thin cell electromembrane separator, magnetic rubber materials, disc gaskets for alcoholic beverage bottle caps, freeze resistant seal rings, gaskets for plastic castings, expansion joints and waterstops, corrosion-resistant conduit connectors, flexible magnetic plastics, pipe joint seals, integral weatherproof plastic lid and hinge for electrical outlets, magnetic faced foamed articles, jar rings, flexible gaskets, glass seals, tamper evident sealing liners, pressure applicators, combined bottle cap and straw structures, large condiment bottle liners, metal caps for applesauce or salsa jars, home canning jars, "crowns," and the like.

Gaskets made from the substantially linear or homogeneous linear ethylene polymers have numerous advantages, especially when used in food-stuff applications. These include: improved taste and odor over incumbent polymer gaskets such as ethylene/vinyl acetate; low adhesion to polar substrates (e.g., polyethylene terephthalate, glass) which is useful for low torque removal of the closure/cap; low extractables (e.g., less than about 5.5% by weight) (also useful for food-stuffs, especially regarding regulatory compliance); good adhesion to non-polar substrates (e.g., polypropylene and high density polyethylene (either linear homopolymer polyethylene or linear heterogeneous high density polyethylene)); Good adhesion in a cap or crown can be described as sufficiently adhering to the substrate. A gasket exhibits this type adhesion when it can only be removed under a cohesive failure mode. Adhesion to metal (such as beer crowns) requires a lacquer that is both compatible with the polymer system and bonds to the metal. One such example that provides good adhesion is a modified polyester provided by Watson Standard (#40-207). Modified epoxy lacquers have also demonstrated good adhesion. Additional benefits include adequate gas and water barrier properties; high melting point relative to incumbent polymers (e.g., ethylene/vinyl acetate); good stress crack resistance; good chemical resistance; variable hardness (useful for specific packaging which may require more or less gasket stiffness, depending on the degree of torque required to seal the container and the internal pressure of the container); and most importantly, excellent processability of the substantially linear ethylene polymers achieved by uniquely controlling the melt flow ratio ($I_{10}/I_2$) independently of the molecular weight distribution ($M_w/M_n$). Substantially linear ethylene polymers having $M_w/M_n$ from about 1.8 to about 2.8, and $I_{10}/I_2$ ratios from about 7 to as high as about 20 are particularly useful in these gasket applications.

Various gasket manufacturing techniques include those disclosed in U.S. Pat. No. 5,215,587 (McConnellogue et al.); U.S. Pat. No. 4,085,186 (Rainer); U.S. Pat. No. 4,619,848 (Knight et al.); U.S. Pat. No. 5,104,710 (Knight); U.S. Pat. No. 4,981,231 (Knight); U.S. Pat. No. 4,717,034 (Mumford); U.S. Pat. No. 3,786,954 (Shull); U.S. Pat. No. 3,779,965 (Lefforge et al.); U.S. Pat. No. 3,493,453 (Ceresa et al.); U.S. Pat. No. 3,183,144 (Caviglia); U.S. Pat. No. 3,300,072 (Caviglia); U.S. Pat. No. 4,984,703 (Burzynski); U.S. Pat. No. 3,414,938 (Caviglia); U.S. Pat. No. 4,939,859 (Bayer); U.S. Pat. No. 5,137,164 (Bayer); and U.S. Pat. No. 5,000,992 (Kelch). The disclosure of each of the preceding United States Patents is incorporated herein in its entirety by reference. Preferably, the gasket is made in a single step process by extruding a portion of the foaming substantially linear ethylene polymer and then immediately compression molding that portion into a gasket, especially where the gasket adheres to a substrate such as phenolic, epoxy or polyester lacqueres.

The gaskets claimed herein are different from those gaskets made by extruded sheets or films by conventional techniques as blown, cast or extrusion coated films, followed by stamping or cutting the gasket from the sheet or film since substantial waste is avoided and more control over gasket dimensions in 1-step process; another advantage of the 1-step process is achieving lower gasket thickness (e.g., from about 5 mils to about 50 mils).

Preferably, the 1-step process for forming a gasket having a Shore A hardness from about 40 to about 95, comprising the steps of:

(a) combining at least one homogeneously branched linear or a homogeneously branched substantially linear ethylene interpolymer, at least one ethylene/carboxylic acid interpolymer or ionomer thereof, at least one slip agent, with at least one blowing agent to from a mixture, (b) extruding said mixture into a pellet, (c) cutting the extruded mixture into a pellet, (d) positioning the cut extruded mixture into a closure, and (e) compression shaping the positioned mixture in said closure. More preferably, for closures having a 28 mm diameter, the cut pellet weighs from about 120 mg to about 300 mg.

Multilayer film structures are also suitable for making the gaskets disclosed herein, with the proviso that at least one layer (preferably the inner layer which is located adjacent to the product) comprises the homogeneously branched linear or homogeneously branched substantially linear ethylene interpolymer. Foam multilayer gaskets comprising the homogeneously branched linear or homogenously branched substantially linear ethylene interpolymers are also useful in the present invention.

EXAMPLES

Gasket Compositions Containing Slip Agents
Examination of Slip Migration on Molded plague Surfaces by Scanning Electron Microscopy (SEM)

For analyzing bottle cap liners, the bottle caps were cut with a thin-bladed saw just above the liner. The liner portion was placed in a Denton DV502A vacuum evaporator and sputter-coated with Cr to approximately 100 A thickness. For compression molded sheets, a piece of sheet material −7 mm×15 mm was cut out with a razor blade and Cr coated in the same way. The purpose of the Cr coating is to give a uniform, electrically conductive surface for the electron beam.

Cr-coated samples were analyzed using a Hitachi S-4100 FEG SEM operated at 5 kV accelerating voltage the same day as coated. In the case of bottle cap liners, photomicrographs were taken from the outer ribs to just inside the central, flat area. Since there is significant (vertical) curvature in this region, the sample stage was tilted up to 300 in order to improve image observation. Tilting also improved image contrast in flat areas with little surface topography. Micrographs were generally taken at 40×, 100×, 300×, and 3,000× magnifications.

Digital Image Analysis (DIA) using a Leica Quantimet Q570 with QUIC 2.0 Software For all but comparative example 6, the calibration value was 0.175 micrometers per pixel; for comparative example 6, the calibration value was 0.592 micrometers per pixel. Maximum diameters were found by thresholding the images to retain the brightest features, then skeletonizing, and removing white triple points. A lower feature limit of six pixels was set for the feature measurement to avoid sizing the artifactual small branches left from skeletonizing. Area fraction was found by performing a mosaic transform, then thresholding to retain the middle range of grey values which contained the non-slip agent portion of the image. The binary produced by these operations was closed by a disc of size one and inverted. The obvious errors were corrected by manual editing and a field measure was done.

The Formulated Compositions

The compositions disclosed herein can be formed by any convenient method, including dry blending the individual components and subsequently melt mixing or by pre-melt mixing in a separate extruder (e.g., a Banbury mixer, a Haake mixer, a Brabender internal mixer, or a twin screw extruder).

Table 3 lists alls of the materials used to produce the various blend samples. The blend samples were produced by first tumble blending the ingredients for at least 20 minutes. The resulting dry blend was then fed into a ZSK 30 twin screw extruder to produce the finished melt blend. A chopper was used in-line with the ZSK 30 to chop the extrudate into pellets.

Example 1

Eighty Seven point seven five percent (by weight of the total composition) of a homogeneously branched substantially linear ethylene/1-octene copolymer having $I_2$ of about 30 g/10 min, density of about 0.9027 g/cm$^3$, $I_{10}/I_2$ of about 7.1, and $M_w/M_n$ of about 2.04 is dry blended and then melt blended with 9.75% (by weight of the total composition) of an ethylene/acrylic acid copolymer having an acrylic acid comonomer concentration of 15%, and $I_2$ of about 20 g/10 min; and with 1.5 percent (by weight of the total composition) of a lubricant (erucamide) and with 1 percent (by weight of the total composition) of a pigment masterbatch. The dry blend is tumble blended in a 50 gallon plastic lined drum for about 20 minutes. The resulting dry blend was then feed into a ZSK 30 twin screw extruder (30 mm screw diameter) to produce a melt blend. A chopper was used in-line with the ZSK 30 to chop the extrudate into pellets. The final composition has an $I_2$ of about 35.79 g/10 min, density of about 0.9095 g/cm$^3$, and $I_{10}/I_2$ of about 7.07.

Example 2

Eighty Seven point seven five percent (by weight of the total composition) of a homogeneously branched substantially linear ethylene/1-octene copolymer having $I_2$ of about 30 g/10 min, density of about 0.9027 g/cm$^3$, $I_{10}/I_2$ of about 7.1, and $M_w/M_n$ of about 2.04 is dry blended and then melt blended (as described in Example 1) with 9.75% (by weight of the total composition) of an ethylene /acrylic acid copolymer having an acrylic acid comonomer concentration of 9.7%, and $I_2$ of about 20 g/10 min; and with 1.5 percent (by weight of the total composition) of a lubricant (erucamide) and with 1.0 percent (by weight of the total composition) of a pigment masterbatch. The final blended composition has an $I_2$ of about 36.34 g/10 min, density of about 0.9088 g/cm$^3$, and $I_{10}/I_2$ of about 6.72.

Example 3

Eighty Seven point seven five percent (by weight of the total composition) of a homogeneously branched substantially linear ethylene/1-octene polymer having $I_2$ of about 30 g/10 min, density of about 0.9027 g/cm$^3$, $I_{10}/I_2$ of about 7.1, and $M_w/M_n$ of about 2.04 is dry blended and then melt blended (as described in Example 1) with 9.75% (by weight of the total composition) of an ethylene/acrylic acid copolymer having an acrylic acid comonomer concentration of 9.7%, and $I_2$ of about 10 g/10 min; and with 1.5 percent (by weight of the total composition) of a lubricant (erucamide) and with 1.0 percent (by weight of the total composition) of a pigment masterbatch. The final blended composition has an $I_2$ of about 34.35 g/10 min, density of about 0.9087 g/cm$^3$, and $I_{10}/I_2$ of about 7.31.

Example 4

Eighty Seven point seven five percent (by weight of the total composition) of a homogeneously branched substantially linear ethylene/1-octene copolymer having $I_2$ of about 30 g/10 min, density of about 0.9027 g/cm$^3$, $I_{10}/I_2$ of about 7.1, and $M_w/M_n$ of about 2.04 is dry blended and then melt blended (as described in Example 1) with 9.75% (by weight of the total composition) of an ethylene/acrylic acid copolymer having an acrylic acid comonomer concentration of 9.7%, and $I_2$ of about 1.5 g/10 min; and with 1.5 percent (by weight of the total composition) of a lubricant (erucamide) and with 1.0 percent (by weight of the total composition) of a pigment masterbatch. The final blended composition has an $I_2$ of about 29.94 g/10 min, density of about 0.9092 g/cm$^3$, and $I_{10}/I_2$ of about 7.63.

Example 5

Eighty Seven point seven five percent (by weight of the total composition) of a homogeneously branched substantially linear ethylene/1-octene copolymer having $I_2$ of about 30 g/10 min, density of about 0.9027 g/cm$^3$, $I_{10}/I_2$ of about 7.1, and $M_w/M_n$ of about 2.04 is dry blended and then melt blended (as described in Example 1) with 9.75% (by weight of the total composition) of an ethylene/acrylic acid copolymer having an acrylic acid comonomer concentration of 6.5%, and $I_2$ of about 9 g/10 min; and with 1.5 percent (by weight of the total composition) of a lubricant (erucamide) and with 1 percent (by weight of the total composition) of a pigment masterbatch. The final blended composition has an $I_2$ of about 33.05 g/10 min, density of about 0.9086 g/cm$^3$, and $I_{10}/I_2$ of about 7.98.

Comparative Example 6

Ninety Seven point five percent (by weight of the total composition) of a homogeneously branched substantially linear ethylene/1-octene copolymer having $I_2$ of about 30 g/10 min, density of about 0.9027 g/cm$^3$, $I_{10}/I_2$ of about 7.1, and $M_w/M_n$ of about 2.04 is dry blended and then melt blended (as described in Example 1) with 1.5 percent (by weight of the total composition) of a lubricant (erucamide) and 1 percent (by weight of the total composition) of a pigment masterbatch. The final blended composition has an $I_2$ of about 35.37 g/10 min, density of about 0.9059 g/cm$^3$, and $I_{10}/I_2$ of about 7.28.

Example 7

Ninety five point five percent (by weight of the total composition) of a homogeneously branched substantially linear ethylene/1-octene copolymer having $I_2$ of about 30 g/10 min, density of about 0.9027 g/cm$^3$, $I_{10}/I_2$ of about 7.1, and $M_w/M_n$ of about 2.04 is dry blended and then melt blended (as described in Example 1) with 2% (by weight of the total composition) of a zinc ionomer of an ethylene/ acrylic acid copolymer having a methacrylic acid comonomer concentration of about 14%, $I_2$ of about 22.34 g/10 min, density of 0.9526 g/cm$^3$, and $I_{10}/I_2$ of 7.40; and with 1.5 percent (by weight of the total composition) of a lubricant (erucamide) and with 1 percent (by weight of the total composition) of a pigment masterbatch. The final blended composition has an $I_2$ of about 36.72 g/10 min, density of about 0.9985 cm$^3$, and $I_{10}/I_2$ of about 7.31.

Example 8

Ninety three percent (by weight of the total composition) of a homogeneously branched substantially linear ethylene/ 1-octene copolymer having $I_2$ of about 30 g/10 min, density of about 0.9027 g/cm$^3$, $I_{10}/I_2$ of about 7.1, and $M_w/M_n$ of about 2.04 is dry blended and then melt blended (as described in Example 1) with 4.5% (by weight of the total composition) of a zinc ionomer of an ethylene/methacrylic acid copolymer having a methacrylic acid comonomer concentration of about 14%, $I_2$ of about 22.34 g/10 min, density of 0.9526 g/cm$^3$, and I$_{10}$/I$_2$ of 7.4; and with 1.5 percent (by weight of the total composition) of a lubricant (erucamide) and with 1 percent (by weight of the total composition) of a pigment masterbatch. The final blended composition has an I$_2$ of about 36.72 g/10 min, density of about 0.9085 g/cm$^3$, and I$_{10}$/I$_2$ of about 7.31.

Example 9

Ninety point five percent (by weight of the total composition) of a homogeneously branched substantially linear ethylene/1-octene copolymer having I$_2$ of about 30 g/10 min, density of about 0.9.27 g/cm$^3$, I$_{10}$/I$_2$ of about 7.1, and M$_w$/M$_n$ of about 2.04 is dry blended and then melt blended (as described in Example 1) with 7% (by weight of the total composition) of a zinc ionomer of an ethylene/methacrylic acid copolymer having a methacrylic acid comonomer concentration of about 14%, I$_2$ of about 22.34 g/10 min, density of 0.9526 g/cm$^3$, and I$_{10}$/I$_2$ of 7.4; and with 1.5 percent (by weight of the total composition) of a lubricant (erucamide) and with 1 percent (by weight of the total composition) of a pigment masterbatch. The final blended composition has an I$_2$ of about 35.3 g/10 min, density of about 0.9085 g/cm$^3$, and I$_{10}$/I$_2$ of about 7.14.

Example 10

Ninety one percent (by weight of the total composition) of a homogeneously branched substantially linear ethylene/1-octene copolymer having I$_2$ of about 30 g/10 min, density of about 0.9027 g/cm$^3$, I$_{10}$/I$_2$ of about 7.1, and M$_w$/M$_n$ of about 2.04 is dry blended and then melt blended (as described in Example 1) with 7% (by weight of the total composition) of a zinc ionomer of an ethylene methacrylic acid copolymer having a methacrylic acid comonomer concentration of about 14%, I$_2$ of about 22.34 g/10 min, density of 0.9526 g/cm$^3$, and I$_{10}$/I$_2$ of 7.4; and with 1 percent (by weight of the total composition) of a lubricant (erucamide) and with 1 percent (by weight of the total composition) of a pigment masterbatch. The final blended composition has an I$_2$ of about 36.4 g/10 min, density of about 0.9088 g/cm$^3$, and I$_{10}$/I$_2$ of about 6.27.

Example 11

Ninety five point five percent (by weight of the total composition) of a homogeneously branched substantially linear ethylene/1-octene copolymer having I2 of about 30 g/10 min, density of about 0.9027 g/cm3, 110/12 of about 7.1, and M$_w$/M$_n$ of about 2.04 is dry blended and then melt blended (as described in Example 1) with 7% (by weight of the total composition) of a zinc ionomer of an ethylene/methacrylic acid copolymer having a methacrylic acid comonomer concentration of about 14%, I$_2$ of about 22.34 g/10 min density of 0.9526 g/cm$_3$, and I$_{10}$/I$_2$ of 7.4; and with 1 percent (by weight of the total composition) of a primary amide lubricant (erucamide) and with 0.5 percent (by weight of the total composition) of a secondary amide lubricant (oleyl palmitamide) and with 1.0 percent (by weight of the total composition) of a pigment masterbatch. The final blended composition has an I$_2$ of 10 min, density of about 0.9085 g/cm$^3$, and I$_{10}$/I$_2$ of about 7.31.

Example 12

Eighty Seven point seven five percent (by weight of the total composition) of a homogeneously branched substantially linear ethylene/1-octene copolymer having I$_2$ of about 30 g/10 min, density of about 0.9027 g/cm$_3$, I$_{10}$/I$_2$ of about 7.1, and Mw/Mn of about 2.04 is dry blended and then melt blended (as described in Example 1) with 9.75% (by weight of the total composition) of a zinc ionomer of an ethylene/methacrylic acid copolymer having a methacrylic acid comonomer concentration of about 14%, I$_2$ of about 22.34 g/10 min, density of 0.9526 g/cm$^3$, and I$_{10}$/I$_2$ of 7.4; and with 1.5 percent (by weight of the total composition) of a lubricant (erucamide) and with 1 percent (by weight of the total composition) of a pigment masterbatch. The final blended composition has an I$_2$ of about 35.04 g/10 min, density of about 0.9103 g/cm$^3$, and I$_{10}$/I$_2$ of about 7.30.

Working Example 1

Thermoplastic resin compositions Examples 1–5 and Comparative Example 6 identified above are extruded from an extruder at a melt temperature of about 430 F. and the molten extrudate is applied to the inside of polypropylene cap closures by a rotary blade, and the applied melt is immediately pressed to form a cap having a liner.

After a period of two weeks, scanning electron micrographs (SEM) were taken of the liner surfaces. Digital Image Analysis (DIA) on a Leica Quantimet Q570 running version 2.0 of the QUIC software was applied to the SEM photographs to characterize the slip distribution on the liner surface. Table 4 contains the results of this analysis.

From the results shown in Table 4, it is readily understood that there is significant difference in the distribution of the slip for the examples of this invention versus the comparative example. For the examples of this invention, the slip resides in smaller domains, there are greater numbers of domains and most importantly, the slip covers up to 2.19 times the surface area. Based on the differences in slip distribution, one would expect the examples of this invention would exhibit lower coefficient of friction.

Working Example 2

Molded plaques of Examples 1–5, 7–12 and Comparative Example 6 were prepared. The plaques were prepared in compliance with ASTM Method D-1928. The resulting plaques were used for coefficient of friction (COF) measurements in compliance with ASTM Method D-1894. The COF measurements were conducted at two times; 1 day and 14 days after the plaques were molded.

Tables 5 and 6 summarize the results of the COF testing. From the Tables one can readily see that the 14 day COF values for the examples of this invention are significantly lower than the comparative example.

TABLE 5

| Polymer | Commercial Designation | Manufacturer | Melt Index (g/10 min) | Density (g/cc) | Mw/Mn | I10/12 | Acrylic Acid % |
|---|---|---|---|---|---|---|---|
| 1 | AFFINITY ™ SM1300 | Dow Chemical | 30 | 0.903 | 2.04 | NM | 0 |
| 2 | AFFINITY ™ SM1350 | Dow Chemical | 30 | 0.913 | 2.17 | 7.1 | 0 |
| EAA1 | Primacor ™ 3340 | Dow Chemical | 9.0 | NA | NA | 7.0 | 6.5 |

TABLE 5-continued

| Polymer | Commercial Designation | Manufacturer | Melt Index (g/10 min) | Density (g/cc) | Mw/Mn | I10/I2 | Acrylic Acid % |
|---|---|---|---|---|---|---|---|
| EAA2 | Primacor ™ 1410 | Dow Chemical | 1.5 | NA | NA | NA | 9.7 |
| EAA3 | Primacor ™ 3440 | Dow Chemical | 10 | NA | NA | NA | 9.7 |
| EAA4 | Primacor ™ 3460 | Dow Chemical | 20 | NA | NA | NA | 9.7 |
| EAA5 | NA | Dow Chemical | 20 | NA | NA | NA | 15.0 |
| SLIP1 | Kemamide E | Witco | NA | NA | NA | NA | NA |
| SLIP2 | Kemamide P-181 (oleyl palmitamide) | Witco | NA | NA | NA | NA | NA |
| colorant1 | Spectratech CM | Quantum Chemical | NA | NA | NA | NA | NA |

TABLE 6

Digital Image Analysis of Scanning Electron Micrographs of Slip on Polymer Surface Statistical Description of Slip Domain Size and Distribution on the Surface

| Slip Distribution | Diameter of Slip Domain (Average) | Diameter of Slip Domain (Median) | Diameter of Slip Domain (Std. Dev.) | Number of Slip Domains | % of Surface Area Covered by Slip |
|---|---|---|---|---|---|
| Example 1 | 1.99 | 1.75 | 0.87 | 745 | 45.7 |
| Example 2 | 1.90 | 1.75 | 0.90 | 550 | 36.1 |
| Example 3 | 2.07 | 1.93 | 0.86 | 660 | 36.4 |
| Example 4 | 1.94 | 1.75 | 0.84 | 534 | 34.1 |
| Example 5 | 1.92 | 1.58 | 1.05 | 747 | 39.3 |
| Comparative Example 6 | 6.45 | 4.73 | 4.12 | 318 | 20.9 |

Note:
Measurements in micrometers (μm).

TABLE 7

Pellet Data

| | Comparative Example 6 | Example 5 | Example 4 | Example 3 | Example 2 | Example 1 |
|---|---|---|---|---|---|---|
| Resins | 97.5% PE** | 87.75% PE** | 87.75% PE** | 87.75% PE** | 87.75% PE** | 87.75% PE** |
| Polar Copolymer | None | 9.75% EAA* | 9.75% EAA* | 9.75% EAA* | 9.75% EAA* | 9.76% XU-60758.05 (EAA* ??) |
| Polar Copolymer % Acrylic acid | None | 6.5% | 9.7% | 9.7% | 9.7% | 15.0% |
| Polar Copolymer I₂ | NA | 9 | 1.5 | 10 | 20 | 20.0 |
| Kinetic COF FM - 2 Weeks | 1.256 | 1.340 | 0.876 | 0.970 | 0.900 | 1.150 |
| Static COF FM - 2 Weeks | 0.796 | 0.812 | 0.710 | 0.618 | 0.554 | 0.484 |
| Kinetic COF PET - 2 Weeks | 2.000 | 0.962 | 0.752 | 1.162 | 1.380 | N/A |
| Static COF PET - 2 Weeks | 2.000 | 0.754 | 0.676 | 0.802 | 0.956 | N/A |
| Kinetic COF PET - 0 Time | 2.000 | 2.000 | 1.900 | 2.000 | 1.990 | N/A |
| Static COF PET - 0 Time | 2.000 | 1.572 | 1.900 | 1.400 | 1.060 | N/A |

*EAA = ethylene/acrylic acid copolymer
**PE = substantially linear ethylene/1-octene copolymer having a density of 0.902 grams/cm³ and I₂ of 30 grams/10 minutes
FM = film to metal
PET = polyethylene terephthalate

TABLE 8

Pellet Data

| | Comparative Example 6 | Example 7 | Example 8 | Example 9 | Example 10 | Example 11 | Example 12 |
|---|---|---|---|---|---|---|---|
| Resins | 97.5% PE** | 95.5% PE** | 93.0% PE** | 90.5% PE** | 91.0% PE** | 90.5% PE** | 87.75% PE** |
| Polar Copolymer | None | 2.0% Surlyn ™ 1702 | 4.5% Surlyn ™ 1702 | 7.0% Surlyn ™ 1702 | 7.0% Surlyn ™ 1702 | 7.0% Surlyn ™ 1702 | 9.75% Surlyn ™ 1702 |
| Polar Copolymer % MAA | N/A | 15.0% | 15.0% | 15.0% | 15.0% | 15.0% | 15.0% |
| Polar Copolymer MI | N/A | 22 | 22 | 22 | 22 | 22 | 22 |
| Kinetic COF FM - 2 Weeks | 1.26 | 0.68 | 0.51 | NM | 0.78 | 0.93 | 0.86 |
| Static COF FM - 2 Weeks | 0.80 | 0.72 | 0.55 | NM | 0.45 | 0.64 | 0.48 |
| Kinetic COF PET - 2 Weeks | 2.00 | 1.28 | 1.03 | 1.65 | 1.55 | 1.26 | 1.24 |
| Static COF PET - 2 Weeks | 2.00 | 0.76 | 0.66 | 1.24 | 1.03 | 1.00 | 0.97 |
| Kinetic COF PET - 0 Time | 2.00 | 2.00 | 2.00 | 1.86 | 1.92 | 1.87 | 1.94 |
| Static COF PET - 0 Time | 2.00 | 1.91 | 1.37 | 1.16 | 1.05 | 0.80 | 1.08 |

**PE = substantially linear ethylene/1-octene copolymer having a density of 0.902 grams/cm$^3$ and I$_2$ of 30 grams/10 minutes Note:
NM = not measured
FM = film to metal
PET = polyethylene terephthalate While not wishing to be bound to any particular theory, two mechanisms are believed to be occurring which provide a better formulation for abrasion resistant surfaces. The first is enhanced slip performance on the surface, and the second is a more puncture resistant surface.

Figure 2:
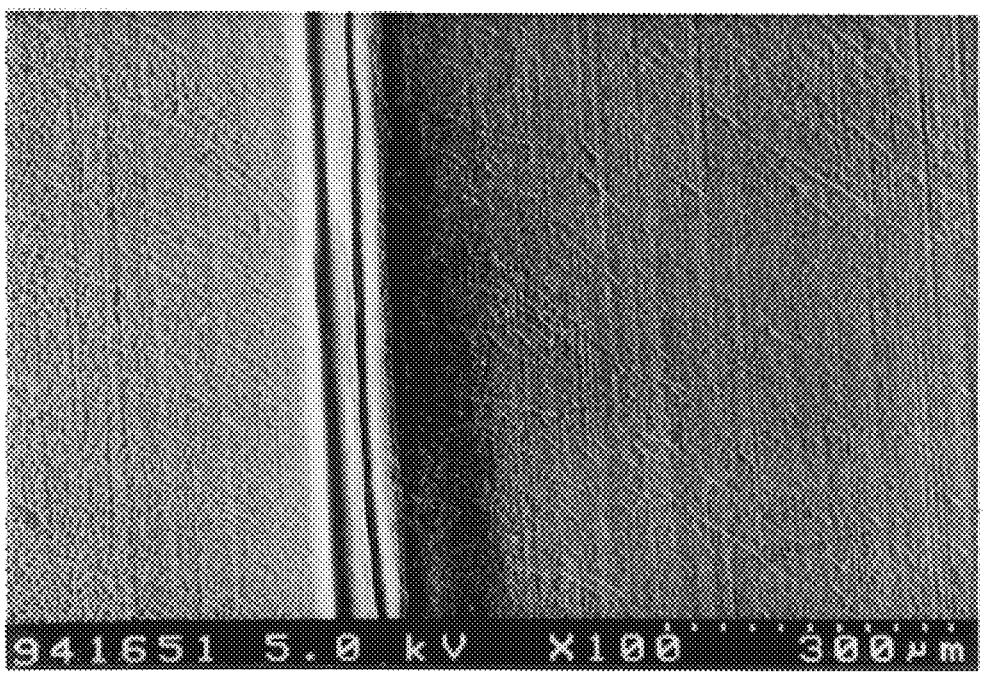
FIG. 2 is a scanning electron micrograph of a molded plaque surface for a blend consisting of 87.75% AFFINITY™ SM 1300 (a substantially linear ethylene/1-octene copolymer made and sold by The Dow Chemical Company), 9.75% Surlyn™ 1702 (a zinc ionomer made from an ethylene/methacrylic acid interpolymer and sold by E. I. duPont de Nemours, Inc.), 1.5% Kemamide E, and 1.0% Spectratech CM 31254.
Figure 3:
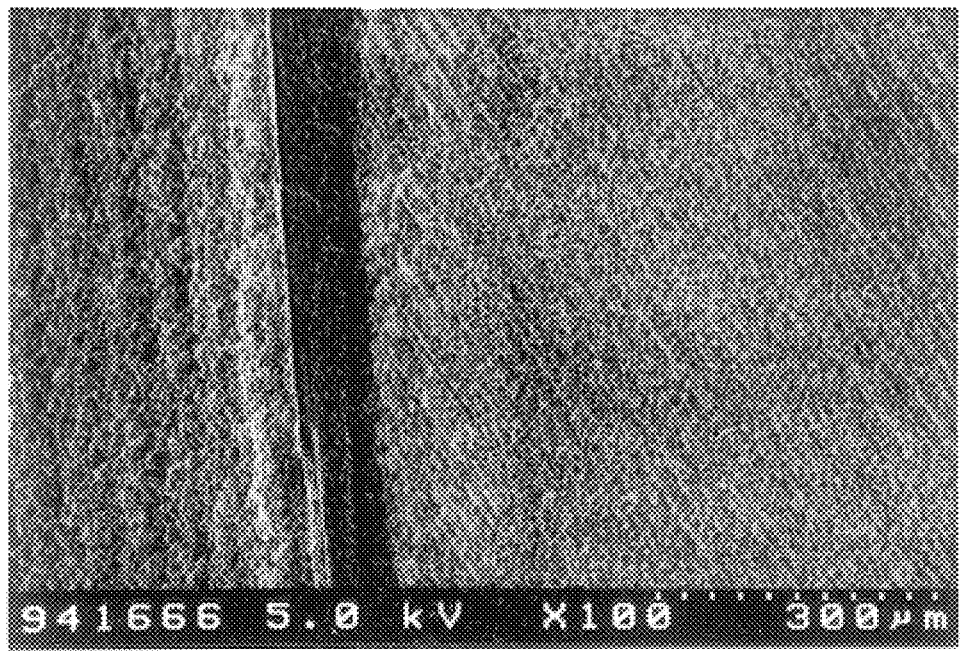
FIG. 3 is a scanning electron micrograph of a molded plaque surface for a blend consisting of 87.75% of a substantially linear ethylene/1-octene interpolymer having a density of about 0.895 g/cm$^3$ and $I_2$ of about 50 grams/10 minutes, 9.75% Primacor™ 5980 (an ethylene/acrylic acid interpolymer made by The Dow Chemical Company having about 20% acrylic acid content), 1.5% Kemamide E, and 1.0% Spectratech CM 31254.
Figure 4:
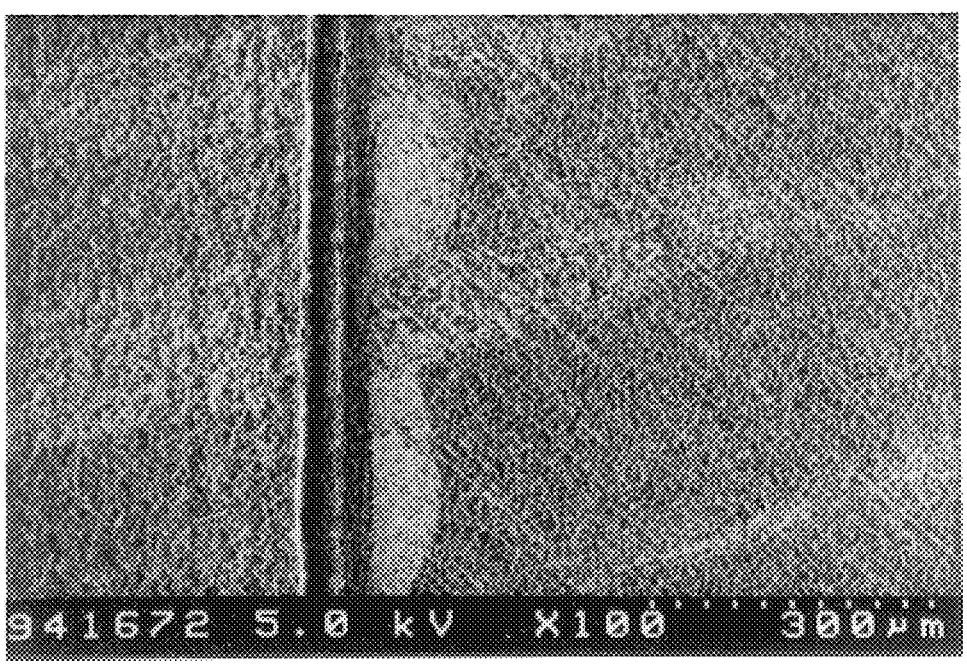
FIG. 4 is a scanning electron micrograph of a molded plaque surface for a blend consisting of 87.75% of a substantially linear ethylene/1-octene interpolymer having a density of about 0.895 g/cm$^3$ and $I_2$ of about 5 grams/10 minutes, 9.75% Primacor™ 5980, 1.5% Kemamide E, and 1.0% Spectratech CM 31254.
Figure 5:
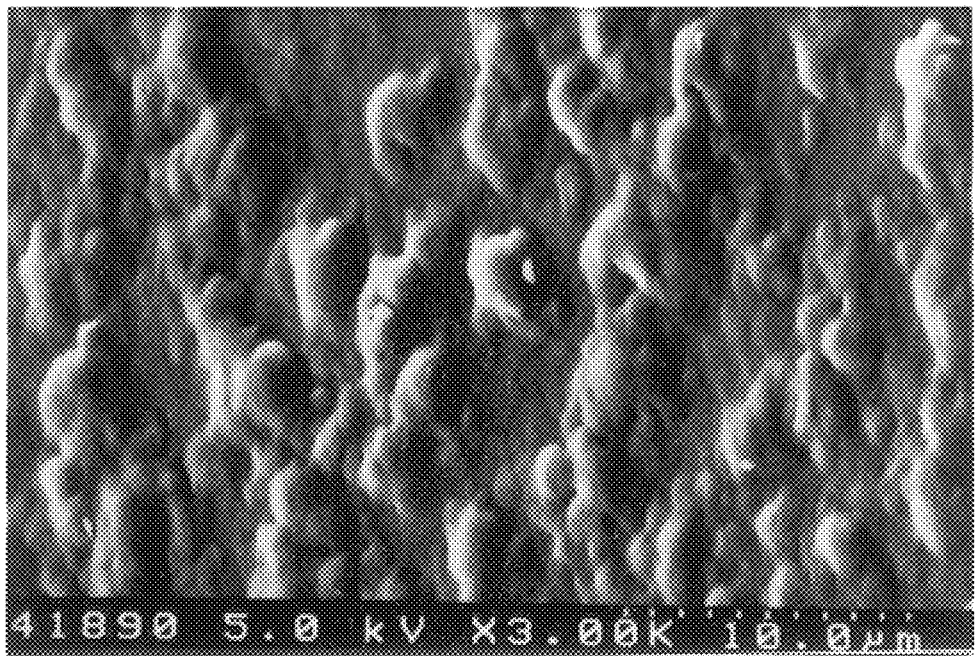
FIG. 5 is a scanning electron micrograph of a molded plaque surface for a blend consisting of 87.75% of a substantially linear ethylene/1-octene interpolymer (AFFINITY™ SM 1300), 9.75% Primacor™ 3340 (an ethylene/acrylic acid interpolymer made by The Dow Chemical Company containing about 6.5% acrylic acid), 1.5% Kemamide E, and 1.0% Spectratech CM 31254.
Figure 6:
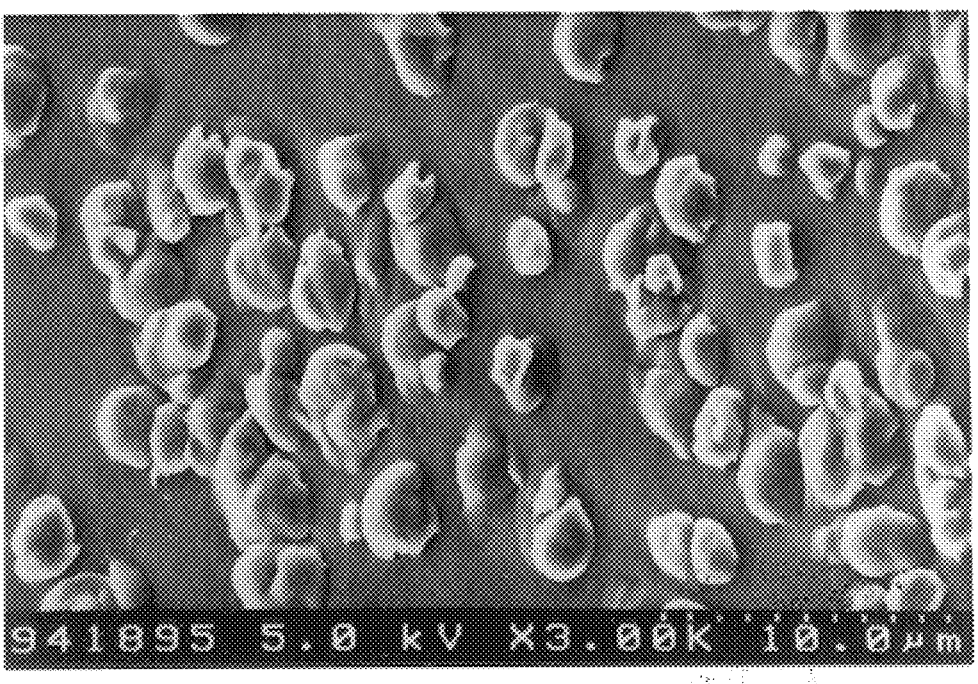
FIG. 6 is a scanning electron micrograph of a molded plaque surface for a blend consisting of 87.75% of a substantially linear ethylene/1-octene interpolymer (AFFINITY™ SM 1300), 9.75% Primacor™ 1410 (an ethylene/acrylic acid interpolymer made by The Dow Chemical Company containing about 9.7% acrylic acid, 1.5% Kemamide E, and 1.0% Spectratech CM 31254.
Figure 7:
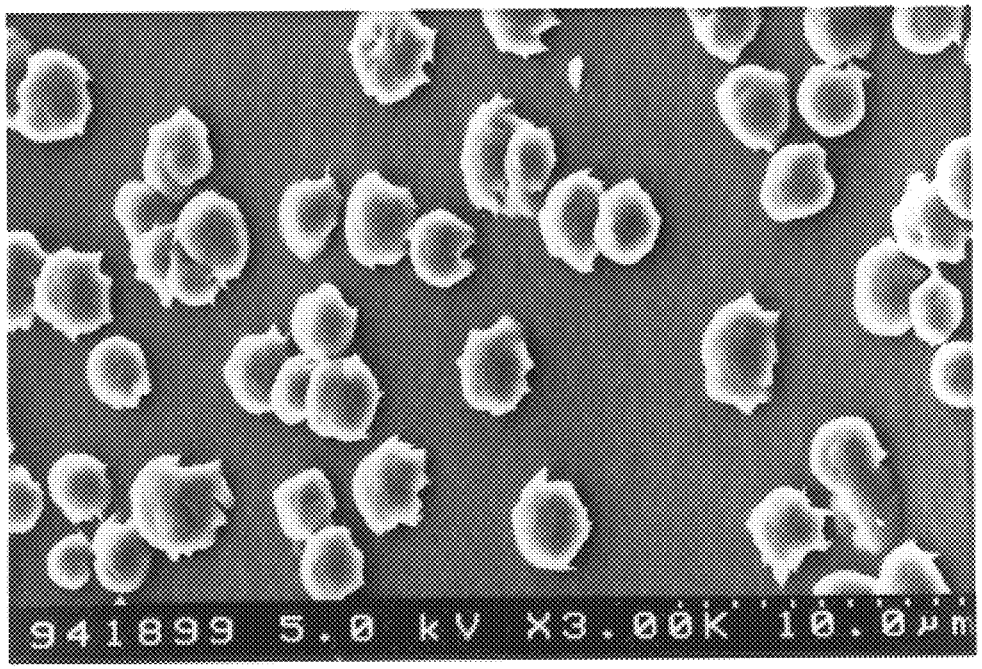
FIG. 7 is a scanning electron micrograph of a molded plaque surface for a blend consisting of 87.75% of a substantially linear ethylene/1-octene interpolymer (AFFINITY™ SM 1300), 9.75% Primacor™ 3440 (an ethylene/acrylic acid interpolymer made by The Dow Chemical Company containing about 9.7% acrylic acid), 1.5% Kemamide E, and 1.0% Spectratech CM 31254.
Figure 8:
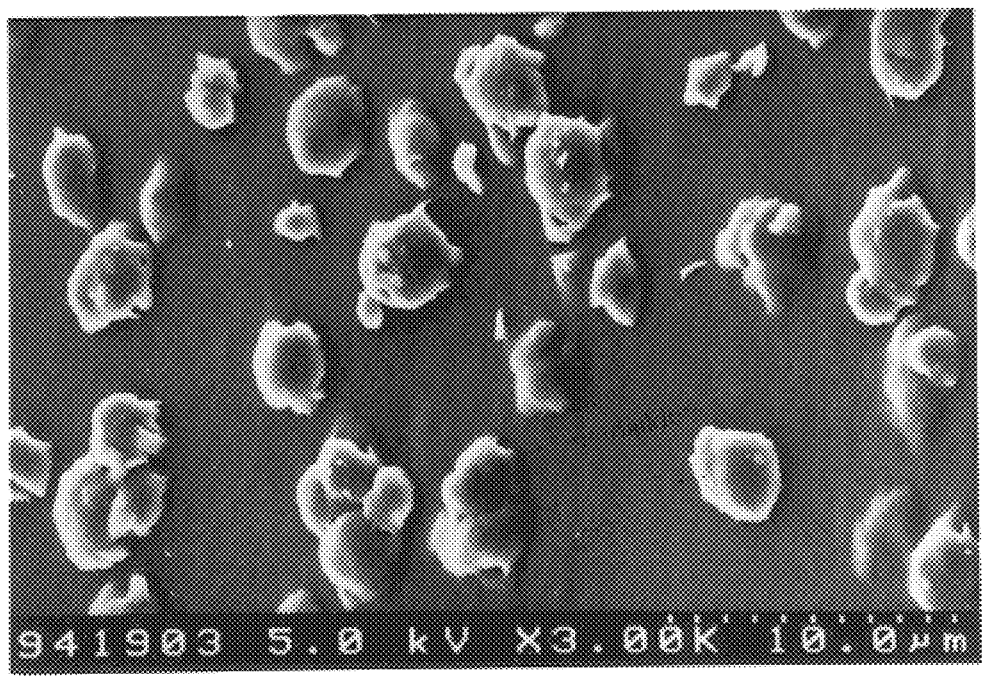
FIG. 8 is a scanning electron micrograph of a molded plaque surface for a blend consisting of 87.75% AFFINITY™ SM 1300, 9.75% Primacor™ 3460 (an ethylene/ acrylic acid interpolymer made by The Dow Chemical Company containing about 9.7% acrylic acid), 1.5% Kemamide E, and 1.0% Spectratech CM 31254.
Figure 9:
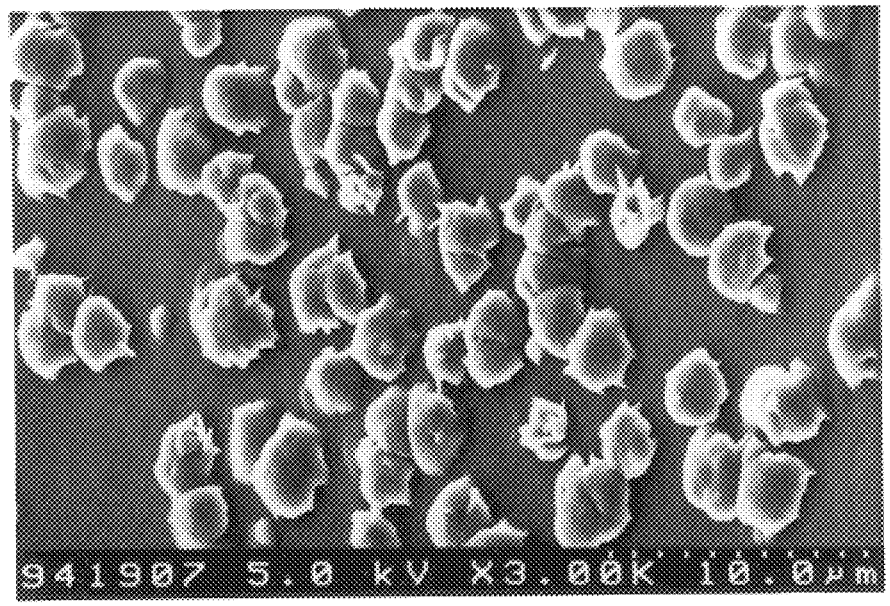
FIG. 9 is a scanning electron micrograph of a molded plaque surface for a blend consisting of 87.75% AFFINITY™ SM 1300, 9.75% of an ethylene/acrylic acid interpolymer made by The Dow Chemical Company containing about 15% acrylic acid and a melt index of about 20 grams/10 minutes, 1.5% Kemamide E, and 1.0% Spectratech CM 31254.

Enhanced slip performance is believed to be due, in part, to a significant change in the form and distribution of the amide slip agent on the surface. Scanning electron microscopy (SEM) shows how the slip agent "wets" out the surface and is distributed much more evenly and completely when ethylene/carboxylic acid copolymers are used in the formulation. There is at least a ten fold decrease in the slip domain size and the distance between slip domains for blends containing ethylene/carboxylic acid copolymers versus a similar formulation with no acid or ionomer functionality. The slip domain sizes are significantly smaller but there are many, many more of them. FIGS. 1 and 2 visually demonstrate the difference in slip distribution and geometry on the surface of systems with and without an ethylene-carboxylic acid, copolymer. FIGS. 2–4 show the similarity of the slip distribution and geometric form of the slip between a blend containing an EAR copolymer and a blend containing an ethylene/methacrylic acid zinc ionomer.. This distribution and geometric form of the amide slip appears to be a function of the % acrylic acid (AA) and to a lesser extent the molecular weight of the polar copolymer. Examples of this are illustrated in FIGS. 5–9. The number of slip domains per unit area increases with increasing % AA (also seen in FIGS. 5–9). At comonomer concentrations >6.5% AA, we see a significant change in the geometric shape of the slip domains and the slip appears to wet out the surface uniformly and shows up as easily distinguished domains (FIGS. 5–9). The SEM photographs (FIGS. 6–8) also indicate that the number of slip domains per unit area decreases with increasing molecular weight.

Another reason for the enhanced slip performance is believed to be because of the slip agent is more tightly bound to the resin substrate. Infrared (IR) analysis indicates that the amide slip agent is hydrogen bonded to the acid groups in the ethylene/carboxylic acid copolymers. The same phenomena is also observed in the IR spectra for the blends using the zinc ionomer of an ethylene/methacrylic acid, and amide slip agents. Additionally, improvements in abrasion resistance due to chemical bonding of slip agents to the contact surface is documented in the literature.

Figure 10:
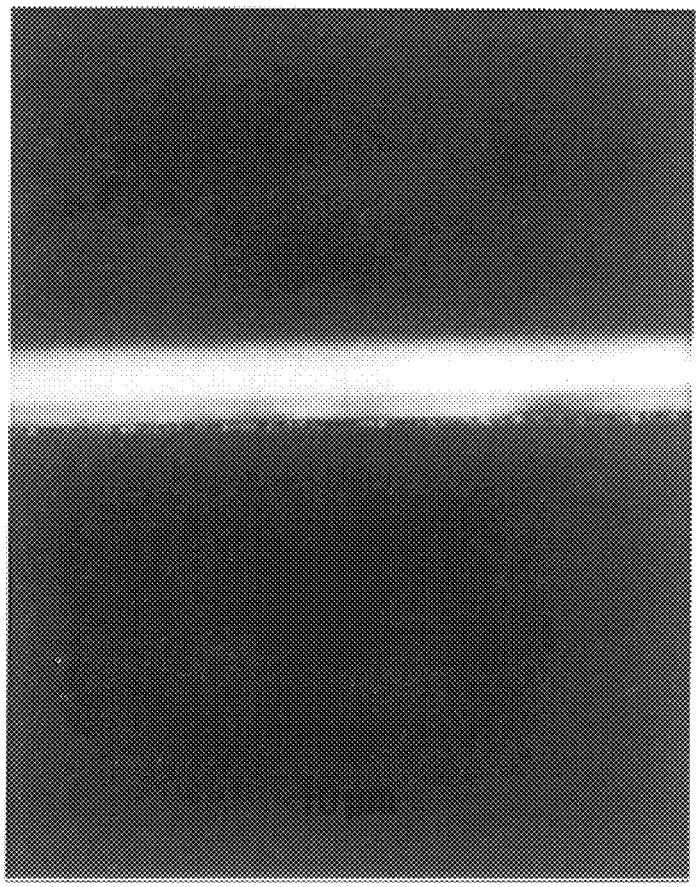
FIG. 10 is an optical micrograph of thin cross section of molded plaque under polarized light for a blend comprised of 87.75% SM 1300, 9.75% Surlyn™ 1702, 1.5% Kemamide E, and 1.0% Spectratech CM 31254.
Figure 11:
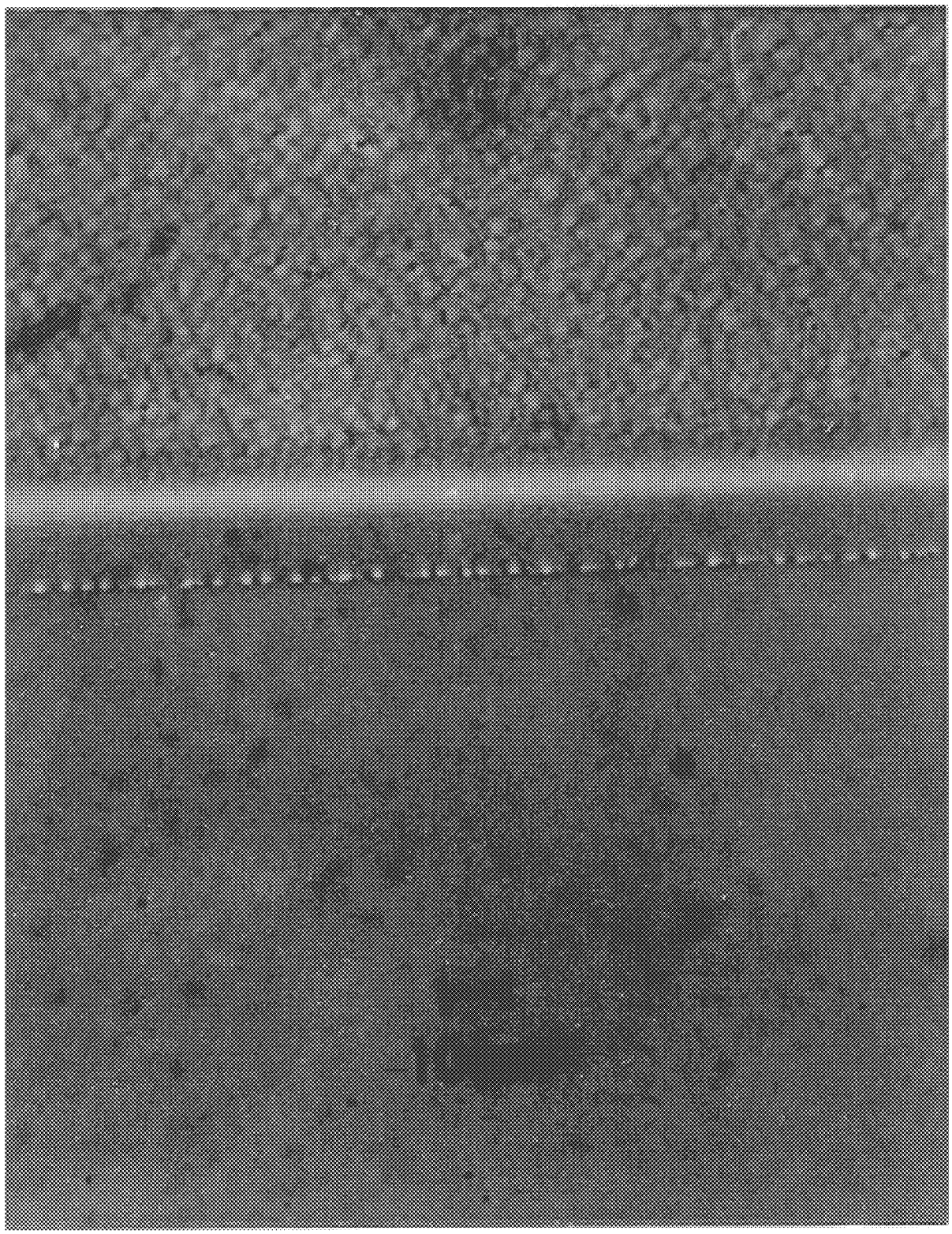
FIG. 11 is an optical micrograph of thin cross section of molded plaque under polarized light for a blend comprised of 97.5% AFFINITY™ SM 1300, 1.5% Kemamide E, and 1.0% Spectratech CM 31254.

The second feature in these systems is a more puncture resistant surface. Using a microscope and a metal probe, the puncture resistance of the surface on a series of closure liners is observed. The surface of closure liners (contained Surlyn® 1702) do not break until the probe penetrates about 4 mils into the liner. Conversely, the surface of closure liners without any ethylene/carboxylic acid in the formulation will break almost immediately upon penetration. Photographs of cross-sections of the liner taken with a polarizer also indicate a significant difference in the morphology of the top 10–15 mm of the surface (FIGS. 10 and 11).

The surface of liners containing the ethylene/carboxylic acid copolymer always respond differently to the polarized light, implying that the surface is more crystalline and/or more oriented; both of which would result in a more puncture resistant surface.

The addition of these components improves the "stringing and scuffing" resistance of the liner because of 1) enhanced slip performance and 2) a more puncture resistant skin layer.

Although the invention has been described in considerable detail through the preceding specific embodiments, it is to be understood that these embodiments are for purposes of illustration only. Many variations and modifications can be made by one skilled in the art without departing from the spirit and scope of the invention.

We claim:

1. A gasket comprising a composition having:
   (A) about 80 to about 97.5 weight percent of at least one homogeneously branched ethylene interpolymer based on the total weight of components (A), (B) and (C);

(B) about 2 to about 15 weight percent of at least one ethylene/carboxylic acid interpolymer or ionomer thereof based on the total weight of components (A), (B) and (C); and (C) at least one slip agent, provided that when the at least one homogeneously branched ethylene interpolymer consists of substantially linear ethylene polymer, the at least one ethylene/carboxylic acid interpolymer or ionomer thereof is at least one ethylene/acrylic acid copolymer or ionomer thereof.

2. The gasket of claim 1 wherein the ethylene interpolymer of (A) comprises either a homogeneously branched substantially linear ethylene/α-olefin interpolymer or a homogeneously branched linear ethylene/α-olefin interpolymer.

3. The gasket of claim 2 wherein the ethylene interpolymer of (A) has:

(i) a density from about 0.85 g/cm$^3$ to about 0.96 g/cm$^3$, (ii) a molecular weight distribution from about 1.8 to about 2.8, (iii) a melt index from about 0.15 g/10 minutes to about 100 g/10 minutes, (iv) no linear polymer fraction, and (v) a single melting peak as measured using differential scanning calorimetry.

4. The gasket of claim 1 wherein the ethylene interpolymer of (A) further comprises a heterogeneously branched ethylene polymer.

5. The gasket of claim 1 wherein the ethylene interpolymer of (A) further comprises a heterogeneously branched ethylene interpolymer having:

(i) a density from about 0.86 g/cm$^3$ to about 0.92 g/cm$^3$, and (ii) a melt index from about 0.15 g/10 minutes to about 100 g 10 minutes.

6. The gasket of claim 1 wherein the ethylene interpolymer comprises from about 85 percent by weight of total composition to about 97.5 percent by weight based on the total weight of the components (A), (B), and (C).

7. The gasket of claim 1 wherein the ethylene/carboxylic acid interpolymer or ionomer thereof comprises from about 4 percent by weight of total composition to about 12 percent by weight based on the total weight of the components (A), (B), and (C).

8. The gasket of claim 1 wherein the ethylene/carboxylic acid interpolymer has an acid content from about 3 percent by weight of the interpolymer to about 50 percent by weight of the interpolymer.

9. The gasket of claim 1 wherein the ethylene/carboxylic acid interpolymer has a melt index from about 0.15 g/10 minutes to about 400 g/10 minutes.

10. The gasket of claim 1 wherein the slip agent comprises from about 0.05 percent by weight of the total composition to about 5 percent by weight of the total composition.

11. The gasket of claim 1 wherein (C) comprises a primary amide agent and a secondary amide agent, together comprising from about 0.05 percent by weight of the total composition to about 5 percent by weight of the total composition.

12. The gasket of claim 11 wherein the primary amide agent is present at a level at least twice that of the secondary amide agent.

13. The gasket according to claim 1 wherein components (A), (B), and (C) of claim 1 together comprises from about 80 percent by weight of the gasket to 100 percent by weight of the gasket.

14. The gasket of claim 1 wherein the gasket is foamed.

15. The foamed gasket of claim 14, wherein the foaming agent is selected from the group consisting of physical blowing agents, gaseous blowing agents and chemical blowing agents.

16. The foamed gasket of claim 14, wherein the foaming agent is a chemical blowing agent selected from the group consisting of sodium bicarbonate, dinitrosopentamethylenetetramine, sulfonyl hydrazides, azodicarbonamide, p-toluenesulfonyl semicarbazide, 5-phenyltetrazole, diisopropylhydrazodicarboxylate, 5-phenyl-3,6-dihydro-1,3,4-oxadiazin-2-one, and sodium borohydride.

17. The foamed gasket of claim 14, wherein the foaming agent is a gaseous blowing agent selected from the group consisting of carbon dioxide and nitrogen.

18. The foamed gasket of claim 14, wherein the foaming agent is a physical blowing agent selected from the group consisting of pentanes, hexanes, heptanes, benzene, toluene, dichloromethane, trichloromethane, trichloroethylene, tetrachloromethane, 1,2-dichloroethane, trichlorofluoromethane, 1,1,2-trichlorotrifluoroethane, methanol, ethanol, 2-propanol, ethyl ether, isopropyl ether, acetone, methyl ethyl ketone, and methylene chloride; isobutane and n-butane, 1,1-difluoroethane.

19. The gasket of claim 3 wherein the ethylene/carboxylic acid interpolymer has an acid content from about 3 percent by weight of the interpolymer to about 50 percent by weight of the interpolymer and a melt index from about 0.15 g/10 min. to about 400 g/10 minutes, and the slip agent (C) comprises a primary amide agent and a secondary amide agent, the primary and secondary amide agents together comprising from about 0.05 percent by weight of the total composition to about 5 percent by weight of the total composition.

20. The gasket of claim 19 wherein the primary amide agent is present at a level at least twice that of the secondary amide agent.

* * * * *